United States Patent
Elman et al.

(10) Patent No.: US 9,536,226 B2
(45) Date of Patent: Jan. 3, 2017

(54) METHOD AND SYSTEM FOR LEVERAGING THE POWER OF ONE'S SOCIAL NETWORK IN AN ONLINE MARKETPLACE

(71) Applicant: LinkedIn Corporation, Mountain View, CA (US)

(72) Inventors: Josh Elman, Mountain View, CA (US); Allen Blue, Sunnyvale, CA (US); James Duncan Work, Knoxville, MD (US); Eric Ly, Los Altos, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 54 days.

(21) Appl. No.: 14/262,198

(22) Filed: Apr. 25, 2014

(65) Prior Publication Data
US 2015/0046353 A1 Feb. 12, 2015

Related U.S. Application Data

(63) Continuation of application No. 11/146,815, filed on Jun. 6, 2005, now Pat. No. 8,713,000.

(60) Provisional application No. 60/643,710, filed on Jan. 12, 2005.

(51) Int. Cl.
*G06F 17/30* (2006.01)
*G06Q 10/10* (2012.01)
*G06Q 30/08* (2012.01)
*G06Q 50/00* (2012.01)

(52) U.S. Cl.
CPC ..... *G06Q 10/1053* (2013.01); *G06F 17/30867* (2013.01); *G06Q 30/08* (2013.01); *G06Q 50/01* (2013.01)

(58) Field of Classification Search
CPC .... G06Q 10/1053; G06Q 30/08; G06Q 50/01; G06F 17/30867
See application file for complete search history.

(56) References Cited

U.S. PATENT DOCUMENTS

| | | | |
|---|---|---|---|
| 5,164,897 A | 11/1992 | Clark et al. | |
| 6,266,659 B1 | 7/2001 | Nadkarni | |
| 6,385,620 B1 | 5/2002 | Kurzius et al. | |
| 7,295,991 B1* | 11/2007 | Clarke | G06Q 10/00 705/40 |
| 7,650,286 B1* | 1/2010 | Obeid | G06Q 10/06 705/1.1 |
| 8,504,559 B1 | 8/2013 | Elman et al. | |
| 8,713,000 B1 | 4/2014 | Elman et al. | |
| 2001/0042000 A1 | 11/2001 | Defoor, Jr. | |
| 2001/0047347 A1* | 11/2001 | Perell | G06F 21/645 |

(Continued)

OTHER PUBLICATIONS

"U.S. Appl. No. 11/146,815, Appeal Brief filed Mar. 2, 2009", 20 pgs.

(Continued)

*Primary Examiner* — Tarek Chbouki
(74) *Attorney, Agent, or Firm* — Schwegman Lundberg & Woessner, P.A.

(57) ABSTRACT

Methods and systems for leveraging one's social network in the context of an opportunities marketplace are described. One aspect of the invention involves integrating social networking features into an online marketplace, or exchange. Accordingly, one aspect of the invention involves facilitating an opportunity search in a manner that provides social networking information with the results of the search.

19 Claims, 18 Drawing Sheets

(56) References Cited

U.S. PATENT DOCUMENTS

| | | | |
|---|---|---|---|
| 2002/0002476 A1* | 1/2002 | Mitsuoka | G06Q 10/06311 705/7.14 |
| 2002/0023230 A1 | 2/2002 | Bolnick et al. | |
| 2002/0046074 A1 | 4/2002 | Barton | |
| 2002/0055870 A1 | 5/2002 | Thomas | |
| 2002/0138456 A1 | 9/2002 | Levy et al. | |
| 2002/0194049 A1 | 12/2002 | Boyd | |
| 2002/0194112 A1 | 12/2002 | Depinto et al. | |
| 2004/0030566 A1 | 2/2004 | Brooks Rix | |
| 2004/0122855 A1 | 6/2004 | Ruvolo et al. | |
| 2004/0148275 A1 | 7/2004 | Achlioptas | |
| 2004/0215793 A1 | 10/2004 | Ryan et al. | |
| 2005/0021750 A1 | 1/2005 | Abrams | |
| 2005/0033633 A1* | 2/2005 | LaPasta | G06Q 10/1053 434/362 |
| 2005/0125408 A1 | 6/2005 | Somaroo et al. | |
| 2005/0131894 A1 | 6/2005 | Vuong | |
| 2005/0154639 A1 | 7/2005 | Zetmeir | |
| 2005/0159970 A1 | 7/2005 | Buyukkokten et al. | |
| 2005/0159998 A1 | 7/2005 | Buyukkokten et al. | |
| 2005/0171832 A1* | 8/2005 | Hull | G06Q 30/0201 705/7.29 |
| 2005/0177385 A1 | 8/2005 | Hull et al. | |
| 2005/0198305 A1 | 9/2005 | Pezaris et al. | |
| 2005/0216295 A1 | 9/2005 | Abrahamsohn | |
| 2005/0216300 A1 | 9/2005 | Appelman et al. | |
| 2006/0004703 A1 | 1/2006 | Spivack et al. | |
| 2006/0042483 A1 | 3/2006 | Work et al. | |
| 2006/0085259 A1 | 4/2006 | Nicholas et al. | |
| 2006/0100919 A1 | 5/2006 | Levine | |
| 2006/0106670 A1 | 5/2006 | Cai et al. | |
| 2006/0123127 A1 | 6/2006 | Littlefield | |
| 2006/0155750 A1 | 7/2006 | Fowler et al. | |
| 2006/0165040 A1 | 7/2006 | Rathod et al. | |
| 2007/0250361 A1 | 10/2007 | Hazy | |
| 2008/0097826 A1 | 4/2008 | Leach et al. | |
| 2008/0126476 A1* | 5/2008 | Nicholas | G06Q 10/10 709/203 |

OTHER PUBLICATIONS

"U.S. Appl. No. 11/146,815, Appeal Brief filed Jun. 3, 2009", 23 pgs.
"U.S. Appl. No. 11/146,815, Appeal Brief filed Nov. 24, 2009", 23 pgs.
"U.S. Appl. No. 11/146,815, Appeal Decision mailed Feb. 28, 2013", 7 pgs.
"U.S. Appl. No. 11/146,815, Decision on Pre-Appeal Brief Request mailed Jan. 29, 2009", 2 pgs.
"U.S. Appl. No. 11/146,815, Examiner's Answer to Appeal Brief mailed Feb. 17, 2010", 22 pgs.
"U.S. Appl. No. 11/146,815, Final Office Action mailed Feb. 20, 2008", 18 pgs.
"U.S. Appl. No. 11/146,815, Non Final Office Action mailed Jun. 7, 2013", 7 pgs.
"U.S. Appl. No. 11/146,815, Non Final Office Action mailed Jul. 9, 2008", 19 pgs.
"U.S. Appl. No. 11/146,815, Non Final Office Action mailed Aug. 31, 2009", 21 pgs.
"U.S. Appl. No. 11/146,815, Non Final Office Action mailed Sep. 7, 2007", 25 pgs.
"U.S. Appl. No. 11/146,815, Notice of Allowance mailed Dec. 9, 2013", 12 pgs.
"U.S. Appl. No. 11/146,815, Notice of Non Compliant Amendment mailed May 19, 2009", 3 pgs.
"U.S. Appl. No. 11/146,815, Response filed Apr. 9, 2008 to Final Office Action mailed Feb. 20, 2008", 8 pgs.
"U.S. Appl. No. 11/146,815, Response filed Apr. 29, 2008 to Final Office Action mailed Aug. 31, 2009", 6 pgs.
"U.S. Appl. No. 11/146,815, Response Filed Jun. 3, 2009 to Notice of Non Compliant Amendment mailed May 19, 2009", 23 pgs.
"U.S. Appl. No. 11/146,815, Response filed Oct. 7, 2013 to Non Final Office Action mailed Jun. 7, 2013", 6 pgs.
"U.S. Appl. No. 11/146,815, Response filed Oct. 9, 2008 to Non Final Office Action mailed Jul. 9, 2008", 3 pgs.
"U.S. Appl. No. 11/146,815, Response filed Nov. 29, 2007 to Non Final Office Action mailed Sep. 7, 2007", 11 pgs.
"U.S. Appl. No. 11/179,454, Appeal Brief filed Nov. 24, 2009", 19 pgs.
"U.S. Appl. No. 11/179,454, Appeal Brief filed Dec. 8, 2008", 15 pgs.
"U.S. Appl. No. 11/179,454, Appeal Decision mailed Mar. 4, 2013", 6 pgs.
"U.S. Appl. No. 11/179,454, Decision on Pre-Appeal Brief Request mailed Nov. 20, 2008", 2 pgs.
"U.S. Appl. No. 11/179,454, Examiner's Answer to Appeal Brief mailed Feb. 18, 2010", 19 pgs.
"U.S. Appl. No. 11/179,454, Final Office Action mailed Jul. 7, 2008", 17 pgs.
"U.S. Appl. No. 11/179,454, Non Final Office Action mailed Aug. 31, 2009", 16 pgs.
"U.S. Appl. No. 11/179,454, Non Final Office Action mailed Oct. 29, 2007", 18 pgs.
"U.S. Appl. No. 11/179,454, Notice of Allowance mailed May 28, 2013", 9 pgs.
"U.S. Appl. No. 11/179,454, Notice of Non Compliant Appeal Brief mailed Jan. 6, 2009", 2 pgs.
"U.S. Appl. No. 11/179,454, Notice of Non Compliant Appeal Brief mailed May 19, 2009", 2 pgs.
"U.S. Appl. No. 11/179,454, Pre-Appeal Brief Request filed Oct. 7, 2008", 3 pgs.
"U.S. Appl. No. 11/179,454, Response filed Feb. 11, 2009 to Notice of Non Compliant Appeal Brief mailed Jan. 6, 2009", 14 pgs.
"U.S. Appl. No. 11/179,454, Response filed Mar. 27, 2008 to Non Final Office Action mailed Oct. 28, 2007", 9 pgs.
"U.S. Appl. No. 11/179,454, Response filed May 5, 2013 to Non Final Office Action mailed Aug. 31, 2009", 3 pgs.
"U.S. Appl. No. 11/179,454, Response filed Jun. 4, 2009 to Notice of Non Compliant Appeal Brief mailed May 19, 2009", 19 pgs.
"U.S. Appl. No. 11/179,454, Supplemental Appeal Brief filed Jun. 4, 2009", 20 pgs.
"Craigslist Online Community", used WayBackMachine, [Online]. Retrieved from the Internet: <http://www.craigslist.org>, (Jan. 22, 2002), 16 pgs.
Janis, Mara, "List Man", Brandweek, vol. 41, Issue 33, [Online]. Retrieved from the Internet: <URL: http://web.ebscohost.cornlehost/detail ?vid=7 &hid=4&sid=O 1 dd3f56-0414-4428-88b8-525 ... >, (Aug. 21, 2000), 2 pgs.

* cited by examiner

Advanced Job Search

Keywords:

Job Title:

Company:

Location:
Located in or near: ▼
Country: United States ▼
US Zip: 94025
Experience level:
Mid-Senior Level ▼
Search jobs posted:
in the last month ▼

Job Function:
Accounting / Auditing
Administrative
Advertising
Analyst
Business / Management
Consulting
Customer Service
Distribution
Education
Engineering Industry:
Any Industry
High Tech
 Defense & Space
 Computer Hardware
 Computer Software
 Computer Networking Sort search results by:
date posted ▼

Search

*FIG. 1*

Search Results

How your network improves search results | Number of degrees poster is from you (3) | Endorsements the poster has (2) | 35 Your inside connections at that company (viewable on listing)

Showing the first 170 jobs found matching these criteria:

Refine this Search:

Keywords: production manager

Location: Located in or near:

Country: United States

US Zip: 94043

Job Function: Engineering

Sorted by: Date Posted

[Search again]

For additional job results
[Search companies directly ▷▷]

| Title | Company | Location | Date |
|---|---|---|---|
| Senior Engineer - IT Infrastructure and Operations<br>Hiring manager: Katherine H. (4) 23 | Abbott Laboratories<br>Mid-Senior Level<br>Full Time Employee | CA-San Jose | 03/20 |
| Systems Engineer 5<br>Hiring manager: William Davies (1) 0 | Northrup Grumman Mission Systems<br>Mid-Senior Level<br>Full Time Employee | CA-Sunnyvale | 03/20 |
| Media Software Engineer<br>Hiring manager: David H. (0) 0 | SGI<br>Mid-Senior Level<br>Full Time Employee | CA-Mountain View | 03/20 |
| Sr. process Engineer for Undersea High-Rel Optoelectronics<br>Hiring manager: Robert B. (4) | JDS Uniphase<br>Mid-Senior Level<br>Full Time Employee | CA-San Jose | 03/20 |
| Systems Engineer 5<br>Hiring manager: Howard F. (0) 0 | Northrup Grumman Mission Systems<br>Mid-Senior Level<br>Full Time Employee | CA-Sunnyvale | 03/20 |
| Systems Engineer 5 | Northrup Grumman Mission Systems<br>Mid-Senior Level<br>Full Time Employee | CA-Sunnyvale | 03/20 |
| Senior Engineer - IT Infrastructure and Operations<br>Hiring manager: Katherine H. (4) 23 | Abbott Laboratories<br>Mid-Senior Level<br>Full Time Employee | CA-San Jose | 03/20 |
| Systems Engineer 5<br>Hiring manager: William Davies (1) 0 | Northrup Grumman Mission Systems<br>Mid-Senior Level<br>Full Time Employee | CA-Sunnyvale | 03/20 |
| Media Software Engineer<br>Hiring manager: David H. (0) 0 | SGI<br>Mid-Senior Level<br>Full Time Employee | CA-Mountain View | 03/20 |
| Sr. process Engineer for Undersea High-Rel Optoelectronics<br>Hiring manager: Robert B. (4) 2 | JDS Uniphase<br>Mid-Senior Level<br>Full Time Employee | CA-San Jose | 03/20 |

1 | 2 | 3 | 4 | 5 | 6 | Next Page ▷

| Jobs Home | Find Jobs | Saved Jobs | Saved Searches | Employers |

Product Marketing Engineer  ▷ Back to job listing

Company: McAfee, Inc. [More info]   Location: Sunnyvale, CA
Type: Full-time                              (San Francisco Bay Area)
Experience: Mid-senior level           Salary: $70,000-$90,000                — 20
Function: Marketing                       Job Code: MVJ678474
Industry: Computer Software         Date Posted: March 23, 2005

Job hunter overview
This hiring manager has positions open for:
- Senior Product Manager
- Account Manager
- Product Marketing Manager The company Joyce works for, Mcafee, has 12 total openings
— 24

Joyce Randall
Manager, Business Development at McAfee
San Francisco Bay Area

| Currently: | Sr. Product Manager at McAfee |
| Companies: | McAfee [MFE]; Network Security Technologies |
| Primary Industry: | Computer Software |

— 22

Specialties
Market analysis, competitive analysis, strategic product development planning, product requirements definition, collaboration with engineering during the development cycle.

Connections / Network
Joyce's Connections: 14
Romain's Network: 334,200+ users
14

How Are You Linked?
You and Joyce are two degrees apart and share these mutual connections:
Andy McDaniel
Bruce Springsteen

Experience and Endorsements
Manager, Business Development
McAfee (Public Company, 1001-5000 employees; MFE)
Computer Software Industry
May 2003 - Present (1 year 6 month)
  Product management of products related to IT security (host intrusion prevention, antivirus, host-resident firewalls, management of security products). Market research, business case creation, project proposals, market/product requirements documents, white papers, strategic product planning, new product ventures, strategic alliances.

Director of Product Management
Network Security Technologies (privately Held; 51 - 200 employees)
Computer Software Industry
October 1998 - May 2003 (4 years 8 months)
  Product management for the first host intrusion prevention product to enter the market. Worked with development on moving from engineering concept stage to market-ready product. The product was first released in the summer of 2000, rapidly gained market recognition and momentum, leading to the acquisition of Network Security by Network Associates/McAfee in May 2003.

*FIG. 6*

Linkedin Welcome, Alfred | Sign Out   [+ Add Connections]

| Home | Search | Profile | Address Book | Network | Jobs |

Jobs Home    Find Jobs    Applications

Apply for this job

Product Marketing Engineer                                              Back to job listing

| Company: McAfee, Inc. [More info] | Location: Sunnyvale, CA |
| Type: Full-time | (San Francisco Bay Area) |
| Experience: Mid-senior level | Salary: $70,000-$90,000 |
| Function: Marketing | Job Code: MCA2232213 |
| Industry: Computer Software | Date Posted: October 1, 2004 |

①  Enter contact information

Email address                                        Address
[rmiller@diehard4ever.com ▼]              [Street]
[Add email address to your account]        [Street 2]
Home Phone [        ]                              [City]
Mobile Phone [        ]                            [State or Province] [94041]
Work Phone [        ]                              [United States of America ▼]
Minimum of one phone number required Best way to reach me [                    ]

② Write cover letter:                              [See examples]

[                                                             ]

③ Upload Resume:
[Choose Resume] [                    ]    Files size limit: 200K
                                             Formats: MS Word, PDF, Text, HTML ④ Review profile                                   [Update profile]
Your profile, including any endorsements, will be included with   [Get endorsements]
your application. Let your reputation speak for itself!

Rob Miller
        Senior Manager at Intel
6 connections   In the Financial Services Industry: Greater New York City Area
        Currently: Senior Manager, Corporate PMO at Intel
        Companies: Merrill Lynch; Independent; Lehrman Brothers
4 endorsements  Specialties: Business Architecture Technology Planning
        Project/Program Management

[ Next ]
                                                        Review and submit
                                                        your application

*FIG. 7*

To: Harold Masters: <tmasters@ibm.com>
From: Linkedin Jobs: <jobs@Linkedin.com>
Subject: Application for Product Marketing Engineer (#C4313)
Rob Miller Attachments 📎 Rob_Miller.doc

Linkedin Jobs Application

| Applicant: Rob Miller | | | | |
|---|---|---|---|---|
| Application for: "Product Marketing Engineer" #C4313 | | | | |
| How are you "linked" to Rob | | | | |
| ④ You are 4 degrees away from Rob, linked through these contacts: Paul Levine  Mike Sose  Joah Elman  Dave Neptune  Reid Hoffman  see all... | | ○ 35 people in your network may be able to provide a reference or background information of Rob, having worked at the same companies at the same time. Ask them for a reference | Rob has 6 Connections | 👍4 4 endorsements (see below) |
| Cover Letter | Diam rite, Olog sodim zedo nocto vorni conquerti oios. Alum Sit all Amover unti er so Donas so lese ist solo sonisto adesing alt, ut diam Ipsum ei tier yeau it dorican soto nigni reat qoutious. scripti lavis nisi et all ex ea domo. Tuis rolo ou trim ire dorin reprit. Un isim lomini ont so. Regards, Rob Miller | | | |
| Contact Info | Rob Miller  e-mail: miller@gmail.com  567 Rockwell Rd.  Home Phone: 657-976-8766  Palo Alto CA 94026  Best way to reach me: At my home in the morning before 9 | | | |
| Full Profile | Rob Miller  Vice President Business Development at Sierra Design Group  Reno, Nevada Area  Currently: Vice President Development at Sierra Design Group (division of Alliance Gaming)  Companies: Sierra Design Group (division of Alliance Gaming) [agi]  Primary Industry: Gambling & Casinos | | | |
| Summary | Rob is a founding executive for a successful high-tech startup reaching $88million in annual revenue an Inc. 500 status before being acquired in 2003. Bob's background includes service as a Cavalry Officer in the US Army and experience as a staff member to a US Senator on Capitol Hill. With MBAs from both Columbia University and the University of California-Berkeley. Rob received his undergraduate degree from the University of Minnesota. Rob married Amanda O'Connor in 1992 and is the proud father of three children. Molly, Jay, and Came. | | | |
| Specialties | Strategy, Finance, Business Development, General Management, Class II gaming, market development | | | |
| Experience & endorsements | Vice President Business Development  Sierra Design Group (division of Alliance Gaming)  (Public Company: 201-500 employees: agi)  Gambling & Casinos Industry  September 1998 - Present (6 years 3 months)  - Founding senior executive for Inc. 500 high-tech firm  - Led business development and sale reaching $88 in five years | 7 people in your network may be able to provide a reference or background information of Rob, having worked at the same companies at the same time. Ask them for a reference | | |
| | "I very much recommend Rob. He is talented and hard working. Rob can be an asset to any team environment." (January 15, 2004)  - Sanjiv Guita work directly with Rob at Sierra Design Group (division of Alliance Gaming) | | | |
| | "Rob is exceptionally smart and talented. His charismatic personality, execution driven mentality and superb time management ability provides a killer combination to business success. I look forward to working with Rob more in the future; (January 14, 2004)  - Ray Wu was with another company when working with Rob at Sierra Design Group (division of Alliance Gaming) | | | |
| Education | University of Illinois at Urbana-Champaign  B.F.A. Design. September 1987 - May 1991  Illustrator, designer and cartoonist for the school newspaper, The daily Illini. | | | |
| Title: Product marketing Engineer | | | | |
| Job code: C4313 | • View Job Status page  • View Rob's profile  • Search for more candidates | | | |

Create posting  ① Compose  ② Profile prefs  ③ Preview, pay & post

☐ Job Title (up to 100 chars):
[                                    ]

☐ Company name (up to 100 chars):
[                                    ]

☐ Company URL: (optional)
http:// [                             ]

☐ Job Function (Select up to 3)           ☐ Industry (Select up to 3)
[Accounting / Auditing      ▼]           [Defense & Space      ▼]
[Accounting / Auditing      ▼]           [Defense & Space      ▼]
[Accounting / Auditing      ▼]           [Defense & Space      ▼]

☐ Country:
[United States       ▼]

☐ Zip Code:
[              ]

☐ Location Description (Up to 100 chars)
[                                    ]

☐ Job Type
[Full-time        ▼]

☐ Experience Level
[Executive        ▼]

☐ Job Code (Your company's internal job code, optional, Up to 50 chars)
[              ]

☐ Salary  minimum [75000]    maximum [95000]

☐ Location Description: (Up to 1500 chars)
[                                    ]
[                                    ]
[                                    ]

[Next]

*FIG. 11*

Create posting  ① Compose  ② Profile prefs  ③ Preview, pay & post

☐ Show Profile
  Do you wish to show you and your
  profile with the job posting?
  ⦿ Yes  Lots of static content about why
  ○ No   this is valuable and increases likelihood
         of getting the best candidates!

☐ Profile Description (current job title at company)

Profile summary
Joyce Randall
Profile Description
In the Computer Software Industry:
San Francisco Bay Area
㉓ 23 endorsements    get endorsements
❀ 72 connections view and update your full profile ☐ My Role
  ○ Hiring Manager at Mcafee
    I am the Hiring Manager
  ○ Company Recruiter at Mcafee
    I am the recruiter for this position and work at this company
  ○ Recruiter / Staffing Firm
    I am posting this on behalf of another company
  ○ Company Referral
    I am posting this on behalf of my company ☐ Poster Contact Email
  E-mail on file:
  ⦿ dchebney@mcafee.com ▾    Email addresses
                              will NOT be shown
  Enter a new E-mail          on posting or be
  ○ [_____] ▾        made public Save as draft                              [ Next ]

Manage Posting - Open Postings           ▭ Create a new posting
You have 3 open postings, 2 past postings, and 2 drafts    🔍 Search for candidates

| Open postings | | | | | |
|---|---|---|---|---|---|
| Title | Start Date | Expiration Date | State | Applicants | |
| Senior Manager, Engineering (JKF-22314) | 09/27/2004 | 10/27/2004 | open | 20 | Edit |
| Manager, Engineering (FTE-5133) | 09/17/2004 | 10/17/2004 | open | 0 | Edit |
| Lead Engineer (SFO-1131) | 09/10/2004 | 10/10/2004 renew | open | 3 | Edit |

Promotional / static content will appear here if not too many postings

*FIG. 13*

| Home | Search | Profile | Address Book | Network | | Jobs |

Jobs Home    Find Jobs    Applications

Job Detail                                              ⇐ Back to <previous>

Product Marketing Engineer

Company: McAfee, Inc. [More info]        Location: Sunnyvale, CA              ⇨ View job listing
Type: Full-time                                    (San Francisco Bay Area)    ▯ Edit job
Experience: Mid-senior level             Salary: $70,000-$90,000               ▯ Copy job
Function: Marketing                      Job Code: MVJ678474
Industry: Computer Software              Date Posted: March 23, 2005           ⊗ End job
                                         Posted on Sept 9, 2004 - expires Oct 9, 2004    ↻ Renew for 30 more days 🔍 Find candidate    Keywords: [          ]    ☐ only in the San Francisco Bay Area    [ GO ]
   in your network                             ☑ only in the Computer Software Industry

Applicants

| Name | | | Headline | | Date |
|---|---|---|---|---|---|
| John Lagrone | (4) | 👍8 | Marketing Manager at Sun | Reference Search | Mon Sep 13 |
| Jeff Simpson | (1) | 👍0 | Sr. Product Marketing at ActivCard | Reference Search | Mon Sep 13 |
| Rob Duffy | (0) | 👍0 | Product Manager at Zone Labs | Reference Search | Mon Sep 13 |
| Kevin Wombat | (4) | 👍2 | Business Development at Cisco | Reference Search | Mon Sep 13 |
| Jeff Kimball | (0) | 👍0 | Marketing Manager at Sun | Reference Search | Fri Sep 10 |

(4) Number of degrees person is from you    👍2 Number of endorsements the person has Other positions from this poster
Other positions from this company
Similar positions in this category

200 people in your organization's network match this job posting.

10 are 3 degrees away from you or another employee of your organization.

2 are 2 degrees away from you or another employee of your organization. Click here to review candidates and to refine the search.

To increase these numbers, click here to encourage employees of your company to join your organization's employee referral program.

You are 3 degrees from Josh, connected through 3 of your contacts
You are 2 degrees from 1 Endorser.
You know 5 people who have worked in Josh's organizations.
24 There are 4 people in your organization who have close connections to people
What you and Josh have in common

*FIG. 16*

LinkedIn: Search Results - Microsoft Internet Explorer

File Edit View Favorites Tools Help

Address: https://w   Go   Linkedin   Search

DirectEmployers   Linkedin

About  Privacy  Advisory Group

Research this job through your Linkedin network!
There are 479 contacts in your network currently at Booz-Allen Hamilton, and 178 of them are in the Washington D.C. Metro Area.
Click here to see these contacts

Booz | Allen | Hamilton
DELIVERING RESULTS THAT ENDURE

Environmental Policy Analyst, Senior - 01021700

Job Description

[Submit]

Description
Key Role:

Serve as a senior environmental policy management consultant and monitor and audit company operations on a regular basis to ensure compliance with local, state, and federal environmental regulations. Research and develop required environmental operational procedures to ensure company and employee awareness, comprehension, and adherence to approved health, safety, and environmental practices. Develop a program for issuing empty and receiving full hazardous waste containers. Ensure correct packaging, labeling, and transportation of hazardous waste to approved treatment, storage, or disposal facility.

Qualifications
Functional/Industry Knowledge:

-7-10 years of experience with environmental, legislative, and regulatory policy -Experience with Regulatory Authority Issues, Restoration and Cleanup, hazardous Materials and Substance Waste, land Use Controls, and Military Munitions -Experience working with DoD and military clients -Knowledge of CERCLA, RCRA, and BRAC Education/Certifications or equivalent required:

BS degree in a related field; MS or JD degree preferred

METHOD AND SYSTEM FOR LEVERAGING THE POWER OF ONE'S SOCIAL NETWORK IN AN ONLINE MARKETPLACE

RELATED APPLICATIONS

The present application a continuation of U.S. patent application Ser. No. 11/146,815, filed Jun. 6, 2005, which claims priority to U.S. Provisional Patent Application Ser. No. 60/643,710, filed on Jan. 12, 2005, which applications are incorporated herein by reference in their entirety.

TECHNICAL FIELD

At least one embodiment of the present invention relates generally to the integration of a social-networking scheme with one or more on-line marketplaces. More particularly, the present invention provides methods and systems for leveraging one's social-network to gain a competitive informational advantage when participating in an online marketplace.

BACKGROUND

Computer networks, such as the Internet, have given rise to a wide variety of online marketplaces providing people with new ways to buy and sell goods and services, exchange ideas, and generally connect with other people. One service area in particular that has been significantly impacted by the Internet is job search services. The Internet has changed the approach that many people take when performing a search for a new job. Numerous online websites are dedicated to matching job seekers with job providers. Some of the online job matching services are directed to very specific markets, for example, matching computer programmers with short-term contract work.

Nearly all online job services suffer from the same general problem. Studies have shown that more than half of all jobs and consulting contracts are found when the job applicant is personally referred to the hiring organization, as opposed to when the job applicant responds to a job posting and/or applies directly with no previous connection to the hiring organization. From the perspective of a company or other hiring organization, although only a relatively small percentage of all job candidates are referred by someone in the company or hiring organization, these referrals may account for more than half of the people hired for jobs and consulting contracts.

Generally, online job matching services work in much the same way that a traditional newspaper classifieds section works. A company may post information about a job offering to a database that is accessible via a website hosted by the company or a third-party. Accordingly, potential job candidates may browse, research, or even apply for a job posted on the website. Typically, a job posting from an online job matching service identifies the posting organization (e.g., the organization offering the job) and/or the person responsible for the posting. In some cases, a job posting may even include the name of the person making the hiring decision.

Because most jobs are gained through personal connections, a smart job seeker may attempt to find someone with a connection to the posting organization or posting individual through people in the job seeker's social network. Currently, however, online job matching services do not provide any features or functions that facilitate leveraging one's social network while performing an online job search. Instead, a job seeker must use more traditional means of analyzing his or her personal network of contacts after he or she has identified a potential job opening of interest. Alternatively, a job seeker may turn to an online social networking service that he or she may belong to in order to conduct research of his or her social network, and hopefully identify someone within his or her social network who has a connection to the job posting.

Previous job matching services have implemented reputation systems that accrue reputation information by asking participants to rate other participants with whom they have worked or contracted. For example, such a reputation system is described in U.S. Pat. No. 6,567,784 to Hans Max Theodore Bukow. However, the type of reputation system described in the patent to Bukow only provides a job provider or a job seeker with the ability to contact a person who has provided reputation information. For example, the system does not provide a job provider or a job seeker with any insight into how he or she can gain access to a trusted source of information. Furthermore, many people who may be willing to provide a private endorsement may be reluctant to provide a public or formal endorsement or rating. Consequently, participants may find it difficult to obtain reputation ratings utilizing systems that rely exclusively on formal reputation ratings.

BRIEF DESCRIPTION OF THE DRAWINGS

The present invention is illustrated by way of example, and not by way of limitation, in the figures of the accompanying drawings, in which like references indicate similar elements, and in which:

FIG. 1 illustrates an example of a user interface for performing an opportunity search, consistent with one embodiment of the invention;

FIG. 2 illustrates an example of a user interface for displaying the results of an opportunity search, consistent with one embodiment of the invention;

FIG. 5 illustrates an example of a user interface for showing the details of a particular opportunity posting, consistent with one embodiment of the invention;

FIG. 6 illustrates an example of an opportunity provider profile, consistent with an embodiment of the present invention;

FIG. 7 illustrates an example of a user interface for submitting an application for a particular opportunity, consistent with an embodiment of the present invention;

FIG. 8 illustrates an example of a user interface showing a submitted application, consistent with one embodiment of the invention;

FIG. 9 illustrates an example of a job search companion interface, consistent with an embodiment of the invention;

FIG. 11 illustrates an example of a user interface for posting an opportunity, consistent with an embodiment of the present invention;

FIG. 12 illustrates an example of a user interface for controlling access to a particular opportunity posting, consistent with an embodiment of the present invention;

FIG. 13 illustrates an example of a user interface providing a management interface to manage one or more opportunity postings, consistent with an embodiment of the invention;

FIG. 14 illustrates an example of a user interface showing the status of a particular opportunity posting, consistent with an embodiment of the present invention;

FIG. 15 illustrates an example of a user interface showing search results for an employee referral program, consistent with an embodiment of the present invention;

FIG. 16 illustrates an example of a user interface showing the results of a search performed as part of an employee referral feature, consistent with an embodiment of the present invention;

FIG. 18 illustrates an example of a user interface for a job search service providing social networking features, consistent with an embodiment of the present invention.

DETAILED DESCRIPTION

Figure 3:
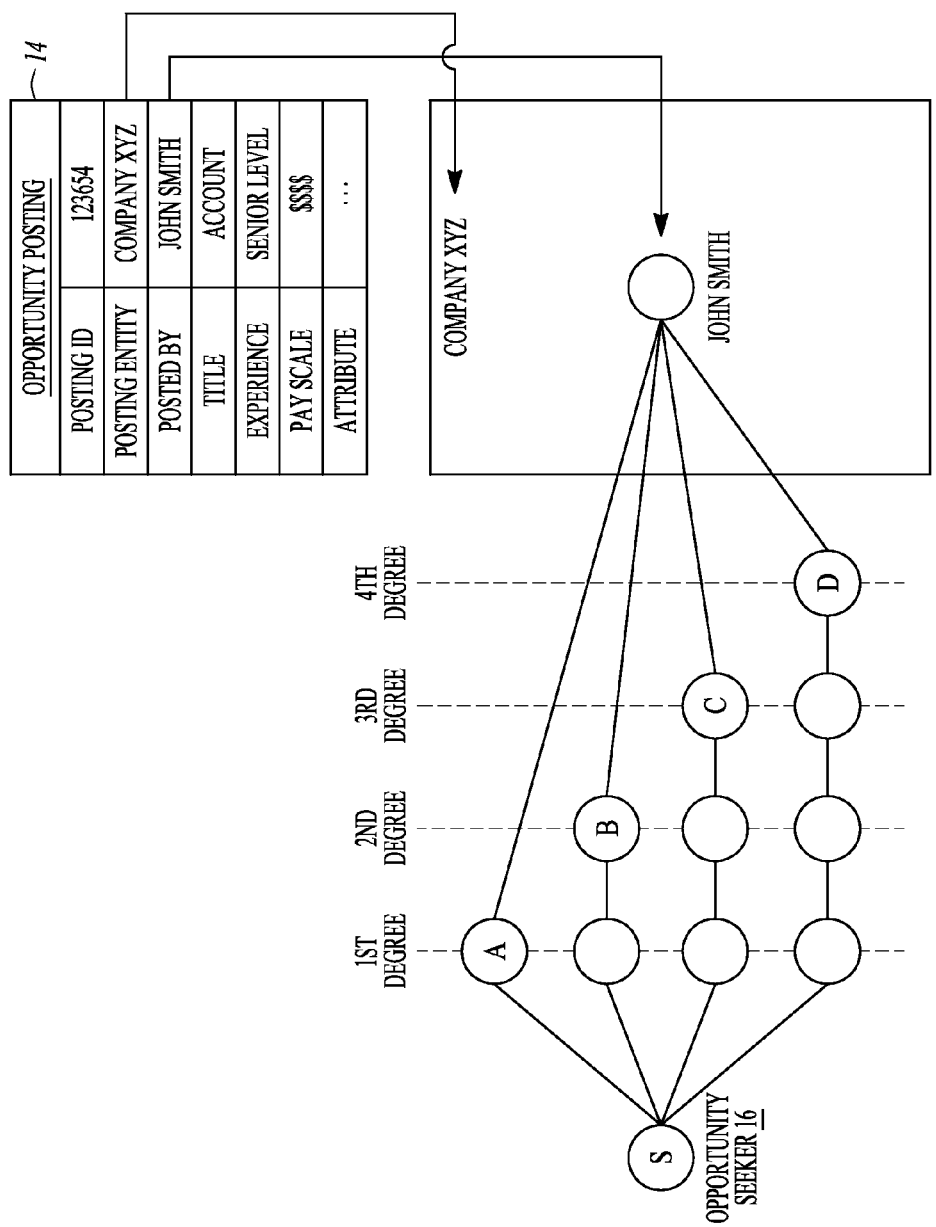
FIGS. 3 and 4 illustrate examples of social network searches associated with an opportunity search, according to two different embodiments of the invention.

Methods and systems for leveraging one's social-network to gain a competitive informational advantage when participating in an online marketplace are described. In the following description, for purposes of explanation, numerous specific details are set forth in order to provide a thorough understanding of the present invention. It will be evident, however, to one skilled in the art that the present invention may be practiced without these specific details.

The present invention involves the integration of social-networking systems and online marketplaces. One embodiment of the present invention provides a unique and important enhancement to social networking systems and services, such as that provided by LinkedIn Corporation of Palo Alto, Calif., accessible at URI: http://www.linkedin.com. Accordingly, many of the methods and systems described herein are closely related to methods and systems described in greater detail in previously filed U.S. patent application Ser. No. 09/852,236, filed on May 8, 2001, and previously filed U.S. Provisional Patent Applications with Ser. Nos. 60/607,040 and 60/625,287 and 60/631,012 filed on Sep. 2, Nov. 4, and Nov. 23, 2004, respectively.

In addition, various embodiments of the present invention provide new and improved functionality and features to online "opportunities" marketplaces, such as online job and consulting exchanges. Although many of the examples provided herein are described in the context of opportunities related to jobs and consulting contracts, it will be appreciated that the present invention is equally applicable to all types of opportunities where it is important for the parties involved to obtain trusted information about each other. Accordingly, aspects of the present invention may be integrated with business brokerage services, business-to-business marketplaces, service related marketplaces, dating services, auction services, etc.

The present invention provides one with the ability to leverage the power of his or her existing social network to gain a competitive advantage in an online opportunities marketplace. One embodiment of the invention provides features of social networking systems that have been specially customized to address the needs of users of opportunities systems. Until the present invention, a number of features of social networking systems have been developed; however none prior to this invention have been specifically developed for or combined with opportunities marketplace applications.

Enhancing a social networking system with an opportunities exchange adds value, from the perspective of the user, and improves the overall user experience. Similarly, integrating social networking features into an online opportunities marketplace or exchange provides market participants with the ability to gain more information and make more informed decisions when participating in, or executing, online and so called "real world" transactions.

One embodiment of the present invention is directed to helping opportunity seekers more quickly and efficiently find and obtain the right job or contract by leveraging their social networks to a) find opportunities that match their qualifications; b) evaluate a particular opportunity and posting organization by getting inside information from people in their social networks who are familiar with the posting organization and managers; and c) get a personal introduction to the opportunity poster from an individual the poster knows and trusts. Currently, opportunities exchanges only provide information on the opportunity poster and applicant. If an applicant wants to find an inside connection to a poster, or vice versa, this must be done outside of the context of the opportunities marketplace. The current invention, for example, significantly reduces the work required of any applicant by showing them a view of the opportunity that already includes the results of the research they would need to do in order to find a personal connection to the opportunity.

In addition, one embodiment of the invention is directed to helping job providers and other opportunity providers with an effective means for finding candidates using their social networks to gain access to deeper information about candidates and to manage and prioritize incoming applicants using that information.

In a computer-implemented social networking scheme consistent with an embodiment of the present invention, users may be grouped into one of two categories—opportunity seekers, and opportunity posters (e.g., job seekers and job posters, buyers and sellers, etc.) An opportunity poster, utilizing an embodiment of the present invention, may be able to both post opportunities and manage applicants (e.g., opportunity seekers who have responded to a posted opportunity). Similarly, opportunity seekers may be able to search, browse and/or respond to opportunities posted by others. In one embodiment, users of the system may be prompted to establish an online social network by first completing a profile and then establishing direct connections, or links, to other users of the system. The procedure for establishing a user profile and building a social network via a social networking system is described in much greater detail in the above-referenced patent applications.

For purposes of clarity, the following description of the invention has been divided into two sections based on the two groups of users—opportunity providers and opportunity seekers. Accordingly, the first section describes aspects of the invention as they relate to a participant in the role of opportunity seeker. The second section presents aspects of the invention as they relate to a participant in the role of opportunity provider. Finally, in the third section, an embodiment of the invention is described for which a social networking system is hosted separately from, but integrated with, an online opportunity exchange.

Many of the examples provided herein are described in the context of employment or job opportunities, however, it will be appreciated that the present invention is not so limited. The present invention may be implemented to work with a wide variety of opportunity exchanges or marketplaces. Accordingly, a social-network system may provide several categories of opportunities, much the same way that classified ads in a newspaper are grouped or classified by subject. In particular, in addition to a job search application, a social-networking system consistent with the present invention may include enhanced social networking features that are integrated with a dating service, a market for goods and services, an activities marketplace, a file sharing service, a ticket exchange, or any other type of online exchange or market. Moreover, the particular market or exchange may exist entirely online, or alternatively, the market or exchange may be enhanced by an online system in the same way that a real world job market is enhanced by an online job search service.

I. Applications for Opportunity Seekers

It will be appreciated that one embodiment of the present invention may be implemented as part of a social networking service, or system. Accordingly, many of the examples provided herein are described in terms of user interface features for a social networking system. In particular, sample web pages are utilized to illustrate how one embodiment of the invention may be implemented. However, one skilled in the art will recognize that the invention may be implemented in a variety of ways, and the examples provided herein are not meant to limit the scope of the invention.

Opportunity Search Interface

FIG. 1 illustrates an example of an opportunity search interface (e.g., job search web page) consistent with a user interface for one embodiment of the invention. Accordingly, in one embodiment of the invention, a user of the social-network-enhanced opportunity system may select a link or button on a user interface to browse or search for potential job opportunities. Accordingly, the user may utilize features available in a standard web browser application to navigate to an "Opportunities" section of a social networking system where the user may interact with an opportunity search interface, similar to the example "Job Search" web page shown in FIG. 1.

In one embodiment of the invention, a navigation header or menu bar (not shown) may provide a user with a button or link to the opportunity search page. Accordingly, the navigation header may be available from any web page hosted by the social networking system or online exchange so that a user may navigate to the opportunity search page at any time, from any web page that is part of the service or system.

In addition, the opportunity search page may include a variety of search fields, such as those illustrated in the job search page shown in FIG. 1. For example, in the context of a job search service, a job search page may include search fields for performing searches based on: Keywords, Job Type (e.g., full-time, part-time, contract), Job Title, Organization, Location, Job Function, Industry, Experience/Skill Level, Salary Range, Organization type, Organization size, etc. Additionally, the search fields available in the job search page may be available in additional search interfaces elsewhere on the jobs site, or on any other portion of the user interface. In particular, the job search results page (illustrated in FIG. 4) may include one or more search fields providing a user the ability to refine a previous search. The social networking service may include a Jobs Home Page, which may include a search interface having a frequently used subset of all searchable fields, for example: keywords, location, industry, and job function.

In one embodiment, when a job seeker is performing a job search, the search may be executed over all active listings in a jobs database. As will be discussed in greater detail below, the jobs database may be hosted by the social networking service, or alternatively, the jobs database may be one of a variety of separately hosted opportunity exchanges that are integrated to function with the social networking system. By default, job postings that satisfy a job seeker's search parameters may be sorted, for example, by date with the most recently posted job listing appearing first. In addition, in one embodiment of the invention, a job seeker may specify filtering criteria (e.g., "any time", "in last day", "in last week", etc.) so that job postings satisfying the job seeker's search parameters may be filtered according to the date on which the job listing was posted. The search results may also be filtered according to the job seeker's specifications regarding the relationship between the job seeker and the job provider (e.g., the person or organization that posted the job listing). For instance, the job seeker may opt to filter the search results to include only those job postings for which the job seeker has a connection to the job provider via the job seeker's social network. For example, the job seeker may opt to only include search results where the job seeker is connected to people in the posting organization within three degrees, or within three degrees and where the connection strength between each connecting individual is equal to or greater than a minimum value.

In addition, a search may also be filtered according to reputation criteria that a job seeker requires for the job provider, including the person or organization posting a job posting. For example, such reputation criteria for the posting individual may include a minimum number of endorsements, or a minimum endorsement score that takes into effect reputation scores for endorsers and/or endorsers' networks. Examples of endorsement and reputations scores that may be utilized with the present invention are described in greater detail in the U.S. Provisional Patent Application Ser. Nos. 60/607,040 and 60/625,287, filed on Sep. 2, and Nov. 4, 2004, respectively.

Instead of or in addition to filtering search results by social network relationship criteria or reputation criteria, a job seeker may also choose to specify that one or more of these criteria be used to sort the results of the search. For example, a job seeker may specify to have the search results first sorted according to relevance of match (e.g., keyword, etc.), then according to a score based on the "closeness" of the relationship between the job seeker and job posting, job provider, or according to any of the reputation indicators implemented in the particular social networking system. Moreover, in one embodiment, the opportunity postings, or job postings may be displayed in an order based in part on some combination of the relevance of the match to the search criteria and the connection strength between the opportunity seeker and the opportunity posting.

The search query format may be either a structured search query (e.g., using pre-defined fields with fixed values, where the field values are combined according to a Boolean expression), or a type of natural language query, or a combination of the two.

Opportunity Search-Results Interface

FIG. 2 illustrates an example of an opportunity search-results interface (e.g., a job search results web page) consistent with a user interface for one embodiment of the invention. The job search results page shown in FIG. 2 includes a listing of search results generated in response to a job seeker's search request. Consistent with one embodiment of the invention, when a search is executed, by default, only a predetermined number of job postings 10 are returned. Furthermore, in one embodiment, each job posting may have a short job posting format, showing only the most relevant high-level information about the posting 10, and a detailed job posting, showing the full details of the job posting. For example, the first fifty job postings may be displayed in short form, along with an option to view an additional page with more search results, if more than fifty job postings satisfied the job seekers search criteria. In addition, the total number of job postings satisfying the job seeker's search criteria may be displayed.

Other aspects of a job search results interface may include an interface for refining a search 12. For example, the interface 12 may provide the ability to modify the search parameters and fine tune the matching job postings. In one embodiment, the interface 12 may display the current search parameters and include the keyword field even if it is empty. In addition, column headers (e.g., location, title, company date) may be included in the results page, allowing a user to re-sort the listed search results based on a user-selected column. For example, in one embodiment, a column header may be a "clickable" link that causes results to be re-sorted, when selected, or clicked. Finally, if a job seeker's search results in more job postings than fit on a single page, the results interface may include features allowing the job seeker to navigate several pages of results. For example, in one embodiment of the invention, up to 50 pages of results may be possible.

Figure 4:
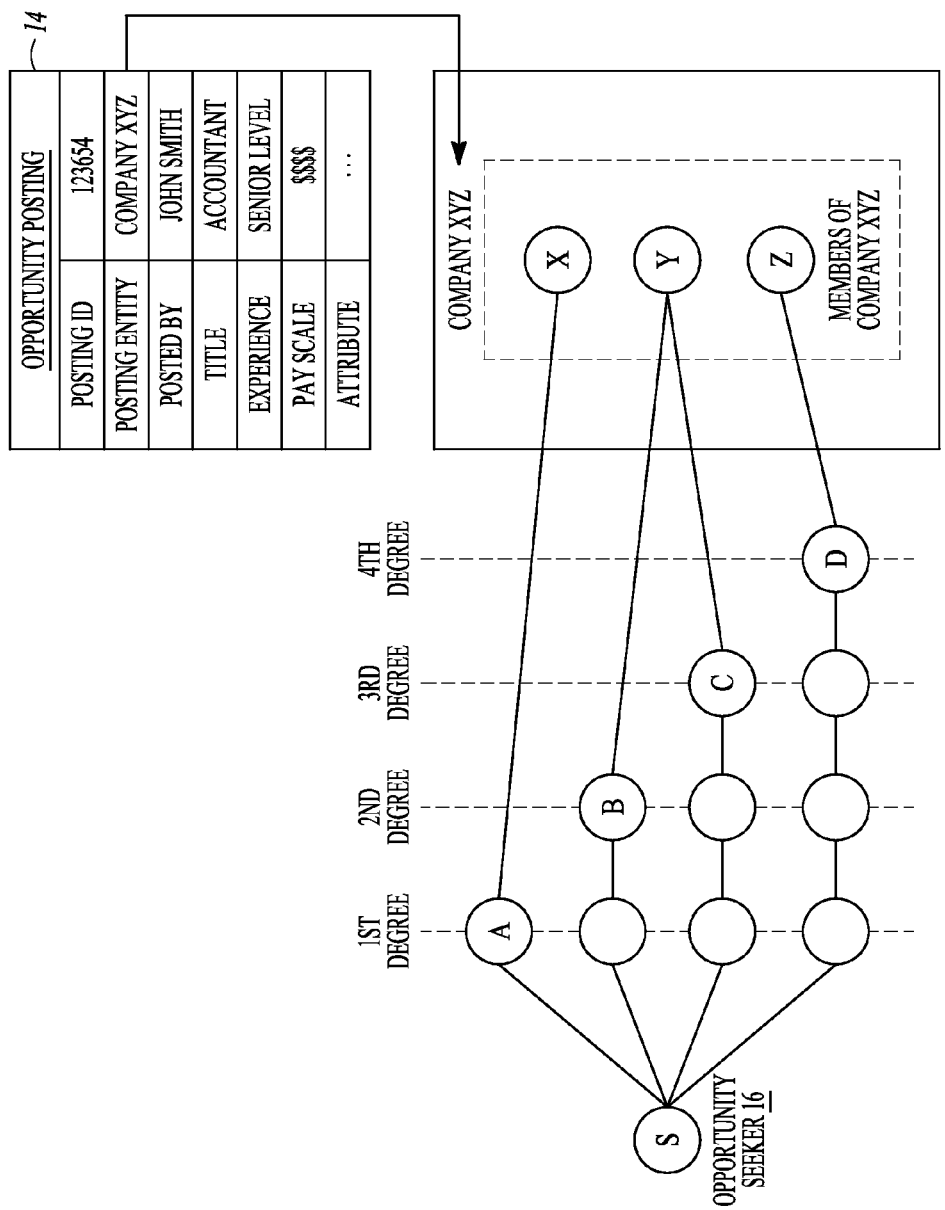

In addition to displaying information related specifically to the job posting that satisfied the job seeker's query, each job posting listed in the job search results interface may include information indicating how closely connected the job seeker is to the entity associated with the job posting. For example, for each job posting satisfying the job seeker's search criteria, a search of the job seeker's social network is performed. FIGS. 3 and 4 illustrate an example of the type of social network search performed in one embodiment of the invention. As illustrated in FIG. 3, for each opportunity posting 14 that satisfies job search criteria specified by the job seeker, a search of the job seeker's social network is performed to determine whether the job seeker may have an inside connection to the opportunity posting 14. Accordingly, in FIG. 3, the opportunity seeker 16 is shown to have four persons within his or her social network with a direct connection to John Smith, the opportunity poster. For example, each of the persons represented by A, B, C, and D are directly connected to John Smith. Furthermore, it can be seen in FIG. 3 that some connection paths may be "stronger" than others. For example, the opportunity seeker's 16 connection to the opportunity posting 14 via person A may be considered stronger because it is a first degree connection, whereas the connection path via person D is a fourth degree connection. As discussed in greater detail below, in alternative embodiments of the invention, the connection strength may be a function of characteristics or attributes other than the degree of connectivity. For example, the connection strength may be a function of the type of relationship that exists between each two persons in the chain of person-to-person connections connecting the opportunity seeker 16 with the opportunity posting 14.

In various embodiments of the invention, the social networking system may establish a connection between the opportunity seeker 16 and the opportunity posting 14 in different ways. For example, as illustrated in FIG. 3, the connection is established via a particular person associated with the posting entity—in this case, John Smith, the person who posted the opportunity posting. However, in FIG. 4, a connection is established by determining all the persons in the opportunity seeker's 16 social network who are current members of the entity associated with the opportunity posting 14. For example, as illustrated in FIG. 4, the opportunity seeker has four total connection paths to the opportunity posting through three different members (e.g., X, Y and Z) of the organization (e.g., Company XYZ) associated with the opportunity posting 14. In alternative embodiments, a connection may be established by identifying persons in the opportunity seeker's social network who are former members of the posting organization. Furthermore, in one embodiment, a connection may be established between the opportunity seeker and the opportunity posting via a person that is in the same affinity group as the opportunity seeker. For example, the social network search may identify persons associated with the posting opportunity that belong to one or more of the same organizations as the opportunity seeker. In another embodiment of the invention, the posting entity may be an individual, as opposed to a company or organization. In that case, connections may be established by identifying persons in the opportunity seeker's social network who have a direct connection to the individual who posted the opportunity.

Short Job Posting

The short format of the job posting shown in the job search results page illustrated in FIG. 2 may include the primary details of the job. For example, in one embodiment of the invention, the job details included in the short format of the job posting may include: a job title, which may include a hyperlink to a detailed view of the job posting; a company or organization name; the date on which the job posting was posted; a location description that may be in a user-specified format, or in a system specified region, defined for example by country and/or zip code; a desired experience level; a job type, for example, full-time, part-time, contract, etc.; a job poster title, or type, for example, hiring manager, recruiter, etc.; social network information (e.g., an indicator to quickly show whether the job seeker has any connections to the job provider). Additionally, in one embodiment, if the job seeker performed a keyword search, phrases in the job posting that include the matching keywords may be shown with the keywords highlighted in bold text.

As indicated above, in one embodiment, each job posting listed in short format may include social network information to let the job seeker know how his or her social network may assist them in learning more about and/or actually getting the job. It may be helpful to think of this social network information in one of three contexts.

First, the social networking information listed in the short format of the job posting may include "inside connection" information, which may indicate how connected the viewer is to significant people in the posting organization. This information may be communicated via a graphical icon, or connectivity indicator, which may quickly communicate to the job seeker how much value the job seeker's social network can provide to get the job seeker access to information sources and decision-makers in the company. This connectivity indicator may be provided as a score, or graphic, which, in one embodiment, may be based on a function or algorithm including a count of the number of people at the job posting organization who are in the job seeker's social network, giving weight to degrees of separation as well as to the total number of connections. Any of the following examples and others like them may be implemented:

(1) A simple count of the number of people in the job seeker's network who are or who have recently been employed in the job posting organization. This count may be executed by searching all individual users of the underlying social networking system who are within a specified distance (e.g., within 4 degrees of separation) of the viewer and whose profiles list current or recent positions (e.g., held within the last 2 years) within the posting organization.

(2) Similar to (1) above, however, greater weight may be given for closer connections, for example, by multiplying connections of two degrees or less by one, connections of three degrees by one-half and connections of four degrees by one-quarter and then summing the result.

(3) Similar to (2) above, except with this addition: Greater weight is given for stronger minimum connection strength between nodes in the chain. For example, in a system where there are three levels of connection strength, "High", "Medium", and "Low", then, where the minimum strength of connection between any of the nodes in a chain of connection between the viewer and the potential helper is "High", multiply the value for the chain derived from the method described in (b) by five, and where the minimum strength is "Medium", multiply the same by three, and for "Low", multiply the same by one.

Additional methods may be derived by using any of methods (1) through (3) above, and additionally by counting not only individuals who are participating as users in the social networking system, but also counting individuals who are not participating as users, but who are listed as contacts in users' address books.

In one embodiment of the invention, one or more graphic icons may be used as connectivity indicators to indicate various levels or measures of the job seeker's "Inside Connections" value, for a given job posting. A probabilistic method for deriving a value to display for this indicator may be used to avoid the heavy computational load required to generate a precise value. For example, a probabilistic method may take into account such factors as: the total number of people who are participating in the job seeker's social network, at each degree of separation, who are or have recently been employed by the job posting organization; the total number of people in the job seeker's network as a whole, and within the particular industry, functional category and geographic region of the posted opportunity and posting organization. These factors may be compared to a table derived from a record of actual connections found between job seekers with similar factors and similar posted opportunities in order to determine the probable value of the current job seeker's connection. Graphic icons or connectivity indicators may be used to represent the probable value rather than stating a precise value.

In addition to "Inside Connections", social networking information pertaining to the degree or distance between the job seeker and job provider may be provided. This can be very useful to let the job seeker know if he or she has a direct inside connection to the person posting the job posting. An alternative is to also take minimum connection strength into consideration, for example, by showing the number of degrees in the shortest connection path and additionally showing a "+" or other symbol as part of a connectivity indicator if the minimum connection strength of one of the shortest connections is at least a certain value. In addition, if there is no degree distance, but the searcher and poster are in a shared affinity group, a small logo to indicate a common affinity group may be shown in addition to, or instead of, the indicator for degree distance.

Finally, the social networking information included in the short format of the job posting may include the number of endorsements of other reputation related information of the job poster. This indicator may be useful to help establish a positive reputation of the poster and/or of the employing organization. The reputation indicators that may be displayed are discussed in greater detail in U.S. Provisional Patent Application Nos. 60/607,040 and 60/625,287 filed Sep. 2, 2004 and Nov. 4, 2004, respectively.

In one embodiment, the reputation and connectivity indicators described above may only be shown if the job poster is visible to the job seeker, or if the information is shown for other prominent people within the organization with whom the job seeker has an established connection via a network of relationships.

Opportunity Page

Figure 5:
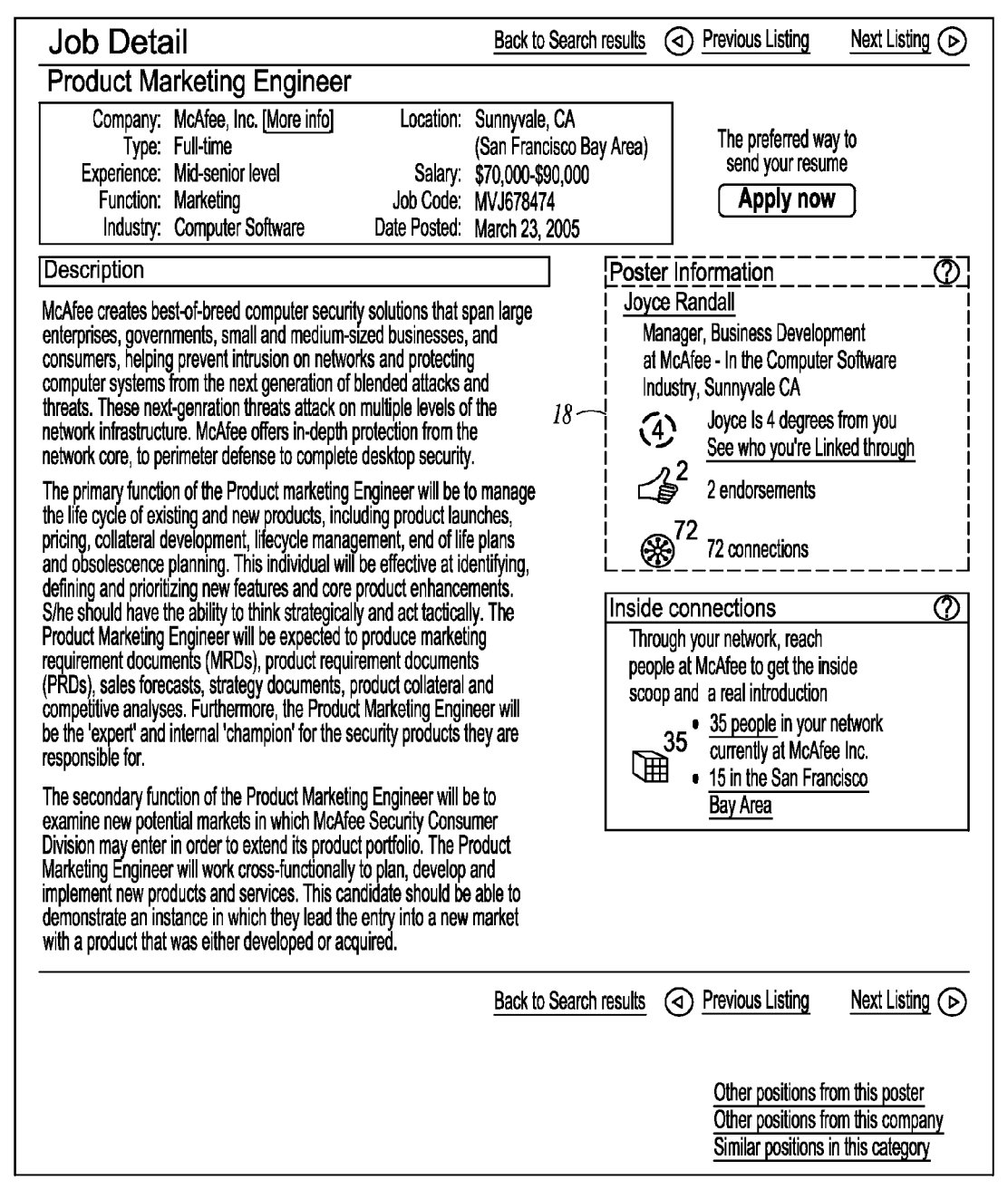

When an opportunity seeker selects (e.g., by clicking) the name of any opportunity listed in the search results page shown in FIG. 2, the opportunity seeker may see a detailed Opportunity Page, such as that illustrated in FIG. 5. In the example Opportunity Page shown in FIG. 5, information about the job poster 18 has been included with the job posting. Consequently, the detailed view of the job posting may include information especially customized for the job seeker, in addition to the same information that every other job seeker would see. For example, the job seeker's social network is leveraged so that the job seeker's view of the detailed job posting may include: the number of mutual connections that the job seeker and the job poster have; how closely the job seeker is connected to the job poster, for example, by how many degrees of separation (within a threshold specified by either the job seeker or the system), and connected through what direct contacts of the job seeker; how many endorsements the job poster has, and optionally how connected the job seeker may be to any of the endorsers; the affinity groups (e.g., professional organizations, schools, etc.) of which the job seeker and job poster are both members; and, the number of people in the job seeker's extended social network who are currently connected to or who have been connected to the posting organization, both globally and in the specific location for the posted opportunity.

The detailed view of the job posting may also include a link that the job seeker can select (e.g., by clicking) to get additional information about any of the social network connections that exist between the job seeker and the job poster or the posting organization. For example, when a job seeker selects a link to view the job poster's profile, he or she may see a web page similar to that illustrated in FIG. 6. For example, in one embodiment, the job poster's profile may be viewable by job seekers only if the job poster has elected to make his or her profile available with the job listing. Furthermore, in one embodiment, viewing of the job poster's profile page may be restricted according to specific instructions provided by the job poster. For example, the job poster may make his or her profile viewable only by persons who are connected to the job poster within a certain number of degrees of separation, or only by persons whose profiles match minimum requirements for the job posted. Alternatively, the job poster's profile page may be made viewable by all users of the social network system.

In one embodiment of the invention, a job poster's profile page may include, but not be limited to, the following three sections: (1) job listing summary 20, with a link back to the job posting; (2) job poster's profile information 22; and (3) a list of all jobs 24 posted by the job poster and/or by the posting organization, plus a link allowing the job seeker to quickly scan those postings. In addition, the job poster's profile page may include information, such as: background information about the job poster's current and prior positions, education, interests, etc.; relationship to the viewer, via the social network of connections, including names of direct connections of the job seeker who link the job seeker to the job poster; endorsements, including a link to endorsers and their qualifications; social networking information showing how the job seeker may be connected to the endorsers of the job poster; other reputation information, such as any one or more of the reputation indicators described in more detail in U.S. Provisional Patent Application 60/625,287.

In one embodiment of the invention, the job poster's profile page may include a section listing other jobs 22 posted by the job poster and posting organization. Accordingly, that section may contain the following information: list of other jobs posted by the job poster; the total number of jobs posted by the organization; and a link to a search interface for searching jobs at the organization. The list of other jobs 22 posted by the job poster may show the title of each job posted by the job poster with a link to the actual job listing. The list may be sorted in order by date, with the most recently posted job listed first. In the case that there are several jobs in the list, the list may only show a predetermined number of the most recent jobs posted, with a link to the additional jobs in the list. The current job (e.g., the job posting that lead the job seeker to the job poster's profile page) may be indicated in the list without link. However, in one embodiment, the current job may always be shown in the list so that the list contains at least one posting.

Actions Available to Opportunity Seeker

Each opportunity posting (e.g., job posting) displayed to the opportunity seeker may include actionable links that allow the opportunity seeker to take various types of actions, including: tendering an offer to accept the opportunity (e.g., applying for a job that is posted), using the social network to find a person who is able and willing to provide more information about the opportunity poster and the posting organization, for example, to do a background check of the reputation of the poster and posting organization; and, searching direct social network connections to select the best suited people who can serve as a reference (e.g., a job reference), or referral.

Applying for the Opportunity

In one embodiment of the invention, to apply for an opportunity, the opportunity seeker may select (e.g., by clicking a link or button) an option entitled "apply for this opportunity (or job)". Accordingly, in one embodiment, the social networking system may perform the following procedures: The opportunity seeker's profile information may be compared to a list of minimum requirements that profiles must meet in order to be considered for the particular type of opportunity for which the job seeker wishes to apply. For example, in the case of a job opportunity, the minimum requirements may include completing information on at least a current employment position, and other positions and educational experiences dating back for a certain time period. If the opportunity seeker's profile does not meet the minimum requirements, for example, if a current employment position is not described in the user's profile, a message may be displayed informing the job seeker as to which parts of his or her profile need more information.

In another embodiment, the opportunity seeker's profile may be compared to minimum requirements for applying for all types of opportunities that the viewer has stated an interest in, for example, each time the opportunity seeker's profile is updated and/or each time the opportunity seeker updates his or her statement of interest with respect to various types of opportunities. The opportunity seeker may be alerted at those times if his or her profile does not meet standard or minimum requirements for viewing or applying for one or more of the types of opportunities that the viewer has stated as an interest. The opportunity seeker may also be advised of what parts of his or her profile need additional information to meet the minimum requirements. In such a case, even before the opportunity seeker applies for a particular opportunity, the system may already have data stored to indicate whether the opportunity seeker's profile meets minimum requirements for any opportunity the opportunity seeker has indicated an interest in applying for.

If the opportunity seeker applies for a particular opportunity and the opportunity seeker's profile meets the minimum requirements for applying for the type of opportunity, then the system may compare the opportunity seeker's profile to the requirements of the particular opportunity that the opportunity seeker has just indicated a desire to apply for. If the results of the comparison indicate that the opportunity seeker's profile does not meet the requirements for the opportunity, a message may be displayed advising the opportunity seeker of the deficiency. For example, such a message might indicate: "Your application can't be accepted since your profile does not seem to meet the minimum job requirements." Alternatively, the message might state, "If you have left off important job experiences, education, and skills, please add them now. If you have references who can endorse your qualifications, we also suggest that you have them endorse your profile. When ready, please submit your application again.

If, on the other hand, the opportunity seeker's profile meets the minimum requirements for the opportunity, then the system may next facilitate the preparation and submission of an application, which may be directly submitted to the opportunity poster, or to another person designated by the opportunity poster. FIG. 7 illustrates an example application interface, for submitting a job application to a job poster.

FIG. 8 illustrates an example of a submitted job application, from the perspective of the job poster. For example, in one embodiment, a submitted application web page, such as that illustrated in FIG. 8, may be displayed to the job poster at some time after a job applicant has submitted an application, such as that illustrated in FIG. 7. For example, in the case of an application for a job opportunity, the application may include a combination of the following information: a reference to the particular job posting, including a summary of details on the posting; the name and identity of the applicant, including a summary of the match between the applicant's profile and the opportunity requirements. In addition, the application may also include information regarding actual or potential overlap between the applicant's social network and the social networks of the job poster and others in the posting organization. As described in greater detail below, this information may help the hiring manager evaluate the applicant by suggesting people to whom the manager may be connected, who can provide more information about the applicant.

Request Reference Information from a Reference Contact

In one embodiment of the invention, the system facilitates the submission of reference information to the job poster. For example, after an application has been submitted to a job poster, the applicant may request a directly connected social network contact to act as a reference. Accordingly, the opportunity seeker (e.g., the job applicant) may submit a request to a directly connected contact, requesting that the contact submit an endorsement, or reference, to the opportunity provider (e.g. the job poster). This may be useful even when the reference has already posted a generalized endorsement in the applicant's profile because a) the reference person may be able to add more information specifically related to the current opportunity, and/or b) the reference may have a close connection to the opportunity poster, either directly or indirectly through the social network, and/or c) the opportunity poster may not be a member of the social network system.

The following provides an example of how this may be implemented in one embodiment. First, an actionable link may be provided to let the applicant send a request to a reference. A message may be constructed and communicated to the reference. The message may include a combination of the following (and other) information: the name of the applicant and a link to the applicant's profile; the relationship between the applicant and the reference; a summary of the opportunity being applied for in addition to a link to the opportunity posting; information on the closest connections between the reference and the poster and posting organization; a copy of any general endorsements that the reference has already supplied for the applicant.

The message communicated from the applicant to the reference may also include actionable links that allow the reference to take action. For example, the reference may write an endorsement specific to the opportunity, which may be appended or attached to any previously-stored generalized endorsement for the applicant. The reference may then select (e.g. by clicking a "send" button) to submit the endorsement, at which time the system will send the endorsement to the opportunity poster in the form of a message. The message may also contain information such as, identifiers of the opportunity and the applicant; the type of relationship between the reference and the applicant; a summary of the reference's qualifications to endorse the applicant for the current opportunity, for example, expertise in the relevant industry and skill areas called for; any existing close relationship between the reference and the poster or posting organization.

The reference or endorsement message may be evaluated before sending it to the opportunity poster to see if it meets filtering instructions specified by the poster. If, for example, the reference message is delivered to the opportunity poster, the poster may have an option to read the reference message immediately or store it for later review. Moreover, a link and a summary of the reference message may be added to the view of the application, such as that illustrated in FIG. 8.

Enhancing Endorsements and Verifying an Applicant's Profile

In one embodiment of the invention, in order to give more credibility to an applicant's profile, as described earlier, applicants are able to ask people they know to add endorsements to their profile. In addition, applicants are able to request verification of certain parts of their profile by qualified third parties. For example, the system may facilitate the following: (1) sending a request by an applicant to a university that the applicant attended requesting that the university verify the accuracy of the applicant's claims to having received a particular degree from the university, (2) facilitating review of applicant's relevant claims by the verifying authority, for example, by providing a link to relevant portions of the applicant's profile, and facilitating sending a verification to the system; (3) receiving the verification and linking it to the relevant part of the applicant's profile.

In addition, the system may have the ability to "lock" a part of a user's profile that has been endorsed or verified. In one embodiment, a "lock" may be implemented as follows. For example, in a situation where a particular applicant's profile shows that an employment position has been endorsed or verified by a former employer, when verification is first attached to the employment position in the applicant's profile, a time and date stamp maybe included with the verification. If a user subsequently attempts to change one or more details of the position, the system may check to see if the position has been verified, for example, by checking for a verification date and time stamp. If so, a message may be displayed to the user indicating that the verification will be deleted if the user changes the details of the position. In such a case, the user may be presented with the following options: (1) to enact the change along with deletion of the verification; or (2) to store the changes as a draft which will not show in the user's profile when viewed by others and to send the draft changes to the person who authored the verification, requesting the verifier to confirm the changes. If the verifier confirms the draft changes, or creates a revised verification, the old or revised verification will continue to appear along with the position. If the verifier does not confirm or revise the original verification, the user will have the option of retaining the draft changes to the position without the verification, or discarding the draft changes and keeping the original details along with the original verification.

In one embodiment, if the user changes the details and an original verification is deleted, this fact will be noted in the user's profile along with the position. In another embodiment, if changes by the user are not confirmed by the verifier, the user may only be presented with the options of keeping the original details or deleting the position altogether.

Limiting Who can View an Opportunity Seeker's Profile

In one embodiment of the invention, an opportunity seeker is given access control over his or her profile. Accordingly, a user may limit who can view his or her profile in response to a search for candidates for an opportunity, for example, a job. This allows a user to control whether his or her profile will be shown in the search results of some searches. For example, the user may not want to be found by job searches initiated by someone in the user's current organization, or past employers.

In one embodiment, the system provides users with the ability to define access instructions related to profile views in response to various types of searches by various people, or people in various organizations, or people or organizations with particular characteristics. For example, a user may be able to construct a rule that specifies when the user's profile will be returned in a search, or whether the user's profile will be returned in a search but the user's identity kept anonymous. The rule may allow the user to specify when and how the user's profile may be viewed or not viewed according to one or more of the following criteria:

(4) The search objectives (e.g., searching for a candidate for a job).

(5) Whether the individual searching is in a list of named individuals.

(6) Whether the individual is a member of a list of named organizations.
(7) Whether the searching individual has a profile that contains one or more profile characteristics, such as skills, seniority, industry, occupation, title, reputation indicators, etc.
(8) Whether the organization of the searching individual, or the organization offering the opportunity, has characteristics such as industry, number of employees, profitability or revenue indicators, location, reputation indicators, etc.
(9) Whether the searching individual is connected to the user within a specified degree or closeness or strength.
(10) Whether the user is connected to the searcher's organization within a specified degree of closeness or strength.

Opportunities Search Companion

In one embodiment of the invention, the system may provide an Opportunities Search Companion (OSC). This feature may be a separate, downloadable software component that assists a user of a social networking system in using the social network to evaluate opportunities posted on many different opportunity systems hosted by many different organizations. For example, in one embodiment, the software application may be combined with the user's browser, e.g., as a "plug-in" that works with the API provided by the maker of the browser. In another embodiment, the software may be combined with the user's mobile phone. The OSC may be able to detect when the user is receiving information (e.g., via a browser or cell phone) about a particular kind of opportunity that the viewer has registered an interest in tracking. Accordingly, in one embodiment, the OSC may attempt to identify the type of an opportunity being received as well as the person and/or organization associated with the opportunity offer.

When these are identified and not ignored based on the user's previous instructions, the OSC may then signal the user, for example, in a pop-up window in the application, and ask the user if the user is interested in finding a social network connection associated with the individual or organization providing the opportunity offering. If the user indicates "yes", then the OSC may send the required information, e.g., identity of the offering individual and organization and identify of the user, to the social network system or systems that the user and opportunity provider, or offerer, participate in.

The social networking system may then respond with information about social network connection paths between the user and the offering individual and/or offering organization. The user may also be presented with options for following up on this information, for example, by providing a link to navigate to other interfaces provided by the social networking system service.

The OSC may be able to detect the type of opportunity being offered and the individual and/or organization making the opportunity offer by comparing the information received with indicators related to the various types of opportunities that the user is interested in or may be interested in stored in the user's profile. For example, the type of offer (e.g., a job offer) and the identity of the offerer may be derived from the source address of the information that is received (e.g., the URI, IM address, or phone number, etc.) and by comparing that address to a table of types of opportunities offered via that address. The type of offer and identity of the offerer may also be discovered by comparing particular components of the information received with indicators accessible to the OSC. For example, embedded metadata such as html or xml codes (or tags) may reveal that a particular portion of the data contains the name of the offering individual or organization or information about the type and nature of the offer.

In addition to automatically finding and displaying connection paths to the user, the OSC may also record details about the opportunity for later review and additional follow-up action.

FIG. 9 illustrates an example of an Opportunities Search Companion that is specifically designed to serve as a job search companion (JSC). In one embodiment, when a user first installs the JSC application into the browser, the JSC may come pre-configured with a list of job sites that it will be able to detect and add value to. For example, the JSC may include a list of URI's that it can detect in the browser's address bar. In one embodiment, the user may be able to edit preferences in order to add to or limit the recognizable URIs in the list. Accordingly, the JSC may detect when the browser has been directed to a job site by matching the current URI of the browser to URI's associated with job sites in the user's preferences.

In one embodiment, when a user is browsing a JSC-activated job site, the JSC "Main Interface" will open next to the page that the user is looking at. In particular the JSC Main Interface (FIG. 9) will open automatically when the user is looking at one or more pages associated with particular types of job search pages, such as job search forms (for entering a job search query), job search results listings, and results for particular jobs. Otherwise, the JSC Main Interface will not be open unless the user has specifically set a preference to have the Main Interface open at all times.

Furthermore, whenever the Main Interface is open, a user may be able to enter a search in a special search interface built into the JSC Main interface. When a user presses the "Search Jobs" button, the JSC will search all job sites in the user's list of preferred sites. Search results may then be returned in the lower section of the Main Interface. The source of each job may be listed in search results and may be indicated by an icon next to the job listed. If the user clicks on the job listing in the Main Interface, the browser may then open the appropriate page on the originating job site that shows details for that job. In addition, special social network information related to the job and the user's own social network (as described above for the OSC) may appear in the Main Interface within the tab "Inside Connections."

Figure 10:
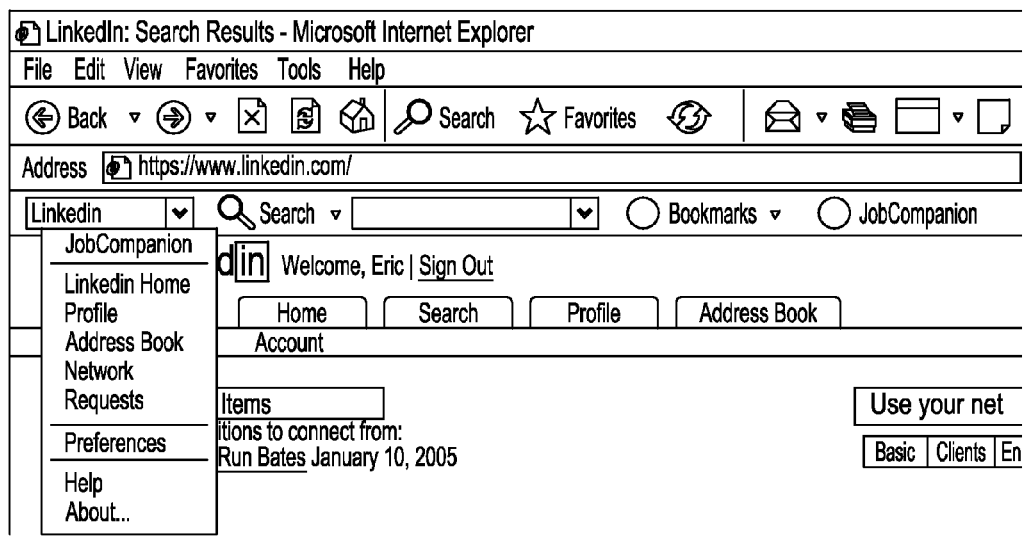
FIG. 10 illustrates an example of a social networking toolbar interface, consistent with one embodiment of the invention.

The JSC Main Interface may also be opened when the user clicks on a menu item labeled "Job Companion" in a special browser "toolbar" for the social networking system that the user has previously installed in the browser. For example, FIG. 10 illustrates a toolbar consistent with one embodiment of the invention. In addition, the user may be able to enter search terms for a job directly into an abbreviated "Search" text box showing in the social networking toolbar.

II. Applications for Opportunity Posters

In addition to the many features and functions available to opportunity seekers, the present invention provides a wide variety of novel and non-obvious features and functions to opportunity providers, or opportunity posters.

Posting an Opportunity

In one embodiment of the invention, an individual user of the social network system may post an opportunity in a specialized posting interface that provides information about the posting individual (e.g., hiring manager), the posting organization (e.g., employing organization), and the opportunity details (e.g., job details). For example, FIG. 11 illustrates an example Opportunity Posting Interface that may be used in one embodiment of the invention, to post an opportunity. Using the interface shown in FIG. 11 an opportunity poster (e.g., job poster) may enter job attributes, including job title, organization name, organization Internet URI, job function category, location, type of job (full-time, part-time, contract), job description, salary range offered, date posted, etc.

In addition to the above listed job attributes, the job poster may choose whether or not to display information about himself or herself along with the job posting. For example, a job poster may select 1) whether or not to show his or her name and profile link with the job posting, 2) the role, or job title, of the poster (e.g., hiring manager, company recruiter, staffing firm, etc.), 3) individual contact information (e.g., email, phone numbers, etc.). These controls and others are shown in the example Opportunity Posting Controls Interface, which is illustrated in FIG. 12.

In one embodiment, the flow for creating an opportunity posting generally includes the following three steps: (1) filling out basic job attributes, (2) filling out information about the individual posting the opportunity, and (3) confirming the opportunity posting, which may include selecting a payment method. In one embodiment, after the user has completed the first step, the system may automatically save the information into a draft copy for the user. This way, if the user decides to exit the flow, at any later point in time, the opportunity provider may return to the draft copy and continue where he or she left off without losing the information he or she had already entered.

In one embodiment of the system, in addition to providing information about himself or herself as the opportunity poster, as shown in the example interface of FIG. 12, the opportunity poster may also provide information about a designated opportunity manager (e.g., a hiring manager) who will review and respond to applications submitted by those interested in the opportunity. In such a case, the system may send a message to the designated opportunity manager asking that person to confirm his role and to confirm or edit other information and settings entered by the opportunity poster on the opportunity manger's behalf.

After an opportunity poster has submitted an opportunity to be posted, the opportunity poster may be prompted to enter payment information. For example, an opportunity posting may be contingent upon the opportunity properly navigating a payment flow during which the opportunity poster may provide a payment for the opportunity posting. In one embodiment, after confirming an opportunity posting and completing the payment transaction, a 'receipt' email will be sent to the user confirming the posting. Accordingly, the receipt may include a link directing the user to a 'Job Status' page with a confirmation message. Furthermore, the 'Job Status' page may include a link to the actual opportunity posting, such as that illustrated in FIG. 5.

Managing Opportunity Postings

In one embodiment, a job poster may manage one or more job postings by navigating to a "Manage Postings" page, such as the example page illustrated in FIG. 13. Utilizing the interface shown in the example page of FIG. 13, an opportunity poster may manage all 'open' postings. Links to the management interface may be available from several other locations, or user interfaces, of the system. However, to access the management interface, a user may have to log-in to the system, for example, by providing a username and password with access rights to the management system. In one embodiment, the management interface includes all of the jobs the user has posted, organized into 3 sections—open postings, past postings, and drafts. Furthermore, there may be a summary count of the total number of jobs for each of these sections, as shown at the top of the example interface of FIG. 13. In one embodiment, those summary links point to the corresponding page for each of the three sections. In one embodiment, there may be additional actionable links that facilitate such tasks as creating new postings, and searching for candidates.

In one embodiment, a list of all open postings is shown on the management page. For each open posting, the management page may include any of the following information: the name of a job posting; a job code (if specified by user); date posted; expiration date; renew link (if within a predetermined number of days from the expiration date)—goes to 'renew' page; state (open); number of applicants; a link to an editing interface for the posting.

The list of jobs posted may be shown in descending order by date posted, with the most recently posted opportunity listed first. The name of each job posting may be linked directly to the corresponding 'Job Status' page for the job. For example, in one embodiment, the Job Status page, an example of which is illustrated in FIG. 14, may shows richer status information about the job and lists all of the actual applications for the job. The number of applications may also be linked to this page. In addition a link directing the user to an editing interface may be included for each job posing in the list. Accordingly, the editing link may lead directly to the main edit page for the job posting. Similarly, a link for renewing the posting may be included. The renew link for each job may lead directly to the renew page for the job posting.

Job Status

FIG. 14 illustrates an example of a "Job Status" interface, consistent with one embodiment of the invention, detailing status information about a particular opportunity posting. In one embodiment the 'Job Status' page is the poster's primary page for working with published job postings.

A job summary section in the "Job Status" interface may include basic summary information about the job listing that appears on the detailed job posting interface. This may include the title of the job and standard criteria. It may display the same way it displays on the job page that will be viewable by job seekers. There may also be a link on the page to go directly to the job listing. For example, in one embodiment, the job summary section may include a "preview" link that allows the job poster to view the job posting as it would be viewed by job seekers. The preview page may include a link to bring the job poster back to the "Job Status" page.

In addition, the job status page may include a billing summary. For example, the billing summary information may show the price of the job posting, when it was paid, the expiration date, and the form or method of payment used, as well as a link to additional payment info.

In one embodiment of the invention, the "Job Status" page may include a section of actionable links associated with different tasks that may be performed in connection with the job posting. For example, for open or active postings, the following links may be available: Renew—goes to 'renew' page; Edit—goes to main 'edit' page for this job; Create copy—goes to 'Create Posting' page and starts a new posting pre-filled with the information in this job; Close/End job—goes to 'Close' page which allows the user to confirm closing the job and taking it out of the live jobs database.

Similarly, for closed or expired postings, the following link may be available: Create copy—goes to 'Create Posting' page and starts a new posting prefilled with the information in this job.

Micro-search for Candidates in Poster's Network

In one embodiment of the invention, an opportunity poster may be provided with a special interface facilitating a search of his or her social network for potential opportunity applicants. For example, the search interface may include a form that is pre-filled with criteria related to a job posting so as to limit the search to individuals who are most likely to be qualified for the job. Moreover, the resulting search may not be restricted to people who have applied for the job, but instead, the search may be executed against the entire network of users of the social networking system who have indicated an interest in receiving information about job opportunities in general, or more specifically about opportunities similar to the opportunity posted. For example, the search results that are returned and the options which the searcher has for following-up on search results may be similar to those described in greater detail in the previously referenced and related patent applications. In one embodiment, a job poster may be able to view the entire profiles of matching candidates, view social network data showing how closely each candidate is connected to the poster (or to other people in the poster's company), view endorsement data including information about the endorser's qualifications and connections between the poster and endorser, view other reputation information, etc.

As shown in FIG. 14, the micro search form may be pre-filled with information associated with a particular job posting, for example: Title of job; Region of job (hidden search field, not shown in search form); Industry of job (hidden); User type is 'potential job candidates' (users who have indicated an interest in job opportunities).

In an alternative embodiment, in addition to or instead of using the contents of a structured search form to define the desired search results, a semantic or concept-matching scheme (for example, using latent semantic indexing or similar methods) may be employed to match the posted requirements for the job to profiles of users in the system.

Applicant List

The "Job Status" page may also include a section showing a list of applicants who have applied for the job associated with the job posting. This section may list all of the people who have applied for the job, including each name linked to the 'Application' page for the specific applicant. Accordingly, each applicant may be listed with their name, headline, date of application, and relevant social network information. In addition, the applicant list may be sorted by the name and/or date applied fields, and by other fields related to the poster's social network connection to the applicants and the poster's ability to use his or her social network to reference check the applicants. For example, the applicant list may be sorted by the "Access Indicator" as described in greater detail in U.S. Provisional Patent No. 60/625,287 filed on Nov. 4, 2004 thus providing a sorting metric indicating the degree to which the job poster may be able to find trusted introductions to people who have or may have worked with the applicant or with the applicant's former employer.

Employee Referral Program Features

In one embodiment of the invention, features related to employee referral programs may be implemented. Recent surveys have indicated that over 66% of mid to large companies now have employee referral programs. An employee referral program is often operated by the company's human resources department and hiring managers as a way to encourage employees of the organization to refer qualified candidates for jobs open in the organization. Research indicates that employees that are referred by individuals who already work in the company are more likely to meet the requirements, to get hired, and to have greater retention longevity than employees who come in without referrals. However, existing employee referral programs are carried out without the benefit of computer-aided social networking systems such as the one described herein.

In existing employee referral programs, an employee may be encouraged to participate in the program and to refer any candidates who he or she may know to be qualified. However, it may be difficult to get widespread participation of employees, even with an incentive program. Furthermore, it is often difficult or impossible for employees who are participating in an employee referral program to be aware of all job openings in their company, and to also be aware of all potential qualified candidates in their 2 to 3 degree social networks. The present invention creates a decentralized solution that insures that job posters, who have the highest motivation for filling the position, will instantly become aware of employees who can refer high quality candidates.

In addition, as described in the following examples, the present invention makes it extremely easy for a job poster to send a request to all employees who can refer a qualified candidate in order to ask them to invite the candidate to apply for the job, or if desired by the job poster, the referring employee may also be asked to directly introduce the employee to the candidate. Additionally, if the employee is not directly connected to the candidate, the job poster may request the employee to introduce the job poster to a person who knows both the employee and the candidate. For example, this could be useful for the purpose of getting additional information about the candidate from someone who knows the candidate, but who may be especially close to the referring employee.

An important part of this invention includes use of special features of a social-network-enhanced opportunities system to make employee referral programs more effective. The methods to implement these special features are described in the following use case examples.

When a job poster posts a job, as described above, the system may then automatically initiate a search for candidates who match the requirements for the posted job and who are within the population of registered members of the underlying social networking system. In one embodiment, only potential candidates who have also indicated an interest in hearing about job openings are included in the result set.

Prior to returning the result set, each of the results may be evaluated in order to calculate the candidates "closeness" to (1) the job poster, or (2) any other employee in the posting organization. For example, closeness may be determined by a combination of degrees of separation and a minimum strength of connections within the chain of connections. The result set may be returned immediately to the job poster based on default settings or specific preferences set by the job poster. For example, the results may always appear, or they may appear only when there is at least one candidate who is connected to an employee in the organization. Or, the result set may not appear and instead a summary of results, such as that illustrated in the example interface shown in FIG. 15 may be displayed.

In one embodiment, to produce this result set, the system may conduct a special count of matching candidates who are within a specified number of degrees (or other measure of closeness) from any employees in the organization, regardless of the potential distance between the job poster and the candidate, or between the job poster and other employees who are connected to the candidate. This is an important distinction, because in a company with fifty-plus employees, many employees may be two or three degrees away from the hiring manager, and thus candidates who are within two or three degrees away from those employees may not show in a search of the job poster's personal network if it is limited for example, to four degrees. Yet, any candidates who are within a low number of degrees of any employee may still be a valuable employee referral.

Referring to FIG. 15, when the job poster clicks on the first link, a summary list of all candidates will be returned, with an option to display those who are within a specified distance to the organization's employees at the top of the list in order of closeness, or in an order that is based on a combination of closeness and strength of match to the job requirements. For example, the values for the measure of fit between job requirements and candidate qualifications may be sorted into several groups (e.g., very high, high, and moderate) and then within each group, candidates may be sorted according to a measure of closeness to employees within the organization.

In each candidate summary listing, indicators may be shown which provide more information about the specific candidates' (1) match to the job requirement, and (2) closeness to the poster or other employees in the company. When the job poster views a profile for a particular candidate, a special link or button may be displayed to enable the job poster to accomplish the following tasks:

(1) Send a request to the candidate through the referral system of the social networking system, i.e., going first to a direct contact of the job poster and then onto other connectors in the chain to reach the candidate. The request sent will include a special embedded link that when clicked by the candidate will direct the candidate to the job opening.

(2) Send a request to one or more employees in the organization who are also connected to the candidate within a specified degree of closeness, to ask those employees to take particular actions, such as sending a request via the social networking referral system to the candidate, inviting the candidate to apply for the job. The request sent will include a special embedded link that when clicked by the candidate will direct the candidate to the job opening.

When an employee acts on a request by a job poster, or acts on his or her own initiative and sends a referral to a job, data on the job referral will be collected to track the referral and insure that the employee gets credit for the referral if it successfully meets criteria set up for receiving referral credit. For example, a referral record will be created with the ID of the employee, the ID of the person referred, and the ID of the job referred. The employee may also receive email or other types of messages to thank the employee for the referral, and to announce incentive awards when they are earned. Other features of standard employee referral programs may also be employed in conjunction with the special features described in this invention.

For example, in another embodiment, job posters, hiring managers, recruiters, etc., and employees who are participating in the employee referral program may also be able to send a special type of message to selected employees in the company inviting them to join the organization's employee referral program. These messages will include a link, which, when clicked by the employee, may enable the employee to join the social networking system.

Applicant Profile View

In one embodiment, when a job poster selects (e.g., by clicking on) an applicants name in the applicant listing for a particular job posting, an Application Profile page may be displayed. Accordingly, an Applicant Profile page may include: a summary of the jobs the applicant has applied for, plus a link to the full job listings; a summary comparison of the applicant's qualifications for each of the primary requirements of the job; profile information on the applicant including current and former positions, skills, education, etc. In addition, the profile may also include a link that will display and print a current copy of the applicant's formal resume. Furthermore, network and reputation indicators for the applicant may be displayed. For example, network and reputation indicators may show an applicant's number of social network connections, endorsement information, third-party verification information, etc.

Reference Check information indicating the degree to which the job poster is able to find trusted introductions to people who may know the applicant and may be able to provide background reference information may also be displayed. This may include, for example, an indication of the number of people in the poster's personal social network who currently work or have worked in the past in the same organization as the applicant. Alternatively, it may include more detailed information such as the summary information illustrated in FIG. 16.

In one embodiment, this display of information related to a reference check may provide links (e.g., the underlined portions of connection information in FIG. 14) to quickly enable the poster to follow-though on the reference check. In the example shown in FIG. 16, the first type of connection shows that there are 3 direct contacts of the job poster who know someone who knows the applicant. The second type of connection in FIG. 16 shows that the poster knows at least one person who knows one of the applicant's endorsers. The third type of connection in FIG. 16 shows that the poster knows five people who work or have worked with the applicant and who thus may know the applicant or someone else who knows him. The forth type of connection in FIG. 16 shows that there are four people in the poster's organization who are closely connected to the applicant via their social networks. In this case, even though the poster doesn't know these four people, they are likely to help the poster reference check the applicant through their contacts since the four work in the same organization as the poster. The fifth type of connection in FIG. 16 indicates that the applicant and poster share other types of connections, such as membership in the same affinity group, former attendance at the same university, etc. By clicking on the link in each type of connection, the poster can thus quickly see who or what the connections are and is then helped by the social networking request system to send a request to the people who can help with the reference check.

Accordingly, utilizing the above features enables a hiring manager to get trusted introductions to potential references who might not otherwise be willing to provide complete information about an applicant, in part due to an increase in employment related litigation which has significantly reduced the cooperation of potential employment references. Being able to find a trusted introduction to a potential reference is an enormous advantage made possible by the present invention, which combines opportunities listing and searching with specially designed social networking features.

Resume Searching

In one embodiment, resume searching is provided. For example, in the context of job and contract opportunities marketplaces, individual users who have opportunities to offer may search a database of resumes of potential candidates. Such resumes need not be limited to current users of the underlying social networking system, but may instead include resumes from a variety of other sources, such as resumes provided by the opportunity provider, for example, by a hiring manager or a recruiter, or resumes provided by third-parties. In such a case, the system may enable the user to search the resume database to not only find a match between opportunity requirements and candidate qualifications, but also to search the social network of the user and others in the user's organization in order to find people with whom the user has a connection and who can potentially provide additional information about the candidates matched by the resume search. For example, when a particular candidate is found in a resume search, the system may additionally search for people in the user's social network who work or have worked in the same organization as the candidate and potentially during the same time frame. This is done, for example, by comparing the employing organizations and dates employed in a resume with employing organizations and dates employed listed in profiles of users of the social networking system who are in the searching user's social network. In addition, the system may be able to search for connections to people who have listed a candidate as a contact, for example, by listing identifying information about the contact, (e.g., name and email address) in their personal contact address book that they have given the user permission to search.

These features extend the reach of the social network opportunities system to include applications for searching external databases in order to find social network connections to individuals of interest who are found in the database. It is another example of this invention's unique ability to apply social networking features to add value to external data sources. The next section describes additional methods for accomplishing that objective.

III. A Social Networking Platform that is Separate from, Yet Works with, One or More Opportunities System.

Much of the description of the invention above provides examples where the opportunity seeker and the opportunity poster are both users of a single system that makes unique use of social networking features to enhance the experience of both types of participants. In a variant of this system, users of a social networking system are able to make use of the social network system features to get inside connections to the opportunity poster or supplying organization even in cases where the opportunity posting is provided in a separate system. For example, social networking features may be integrated into systems where information on the opportunities is hosted, stored and served via internet servers in the control of a different organization from that which hosts, stores and serves information for the social networking system.

FIG. 15 illustrates an embodiment of a system having a social networking system that is separately hosted, but integrated with, an opportunity exchange. For example, as illustrated in FIG. 15, server 26 is hosting a social networking system, while server 28 is hosting an opportunity exchange. Accordingly, the social networking system is shown to include various user profiles containing information about users. Similarly, the server 28 hosting the online opportunity exchange is shown to include several opportunity postings. It will be appreciated by those skilled in the art that the two systems may be separately hosted by several distributed servers.

Figure 17:
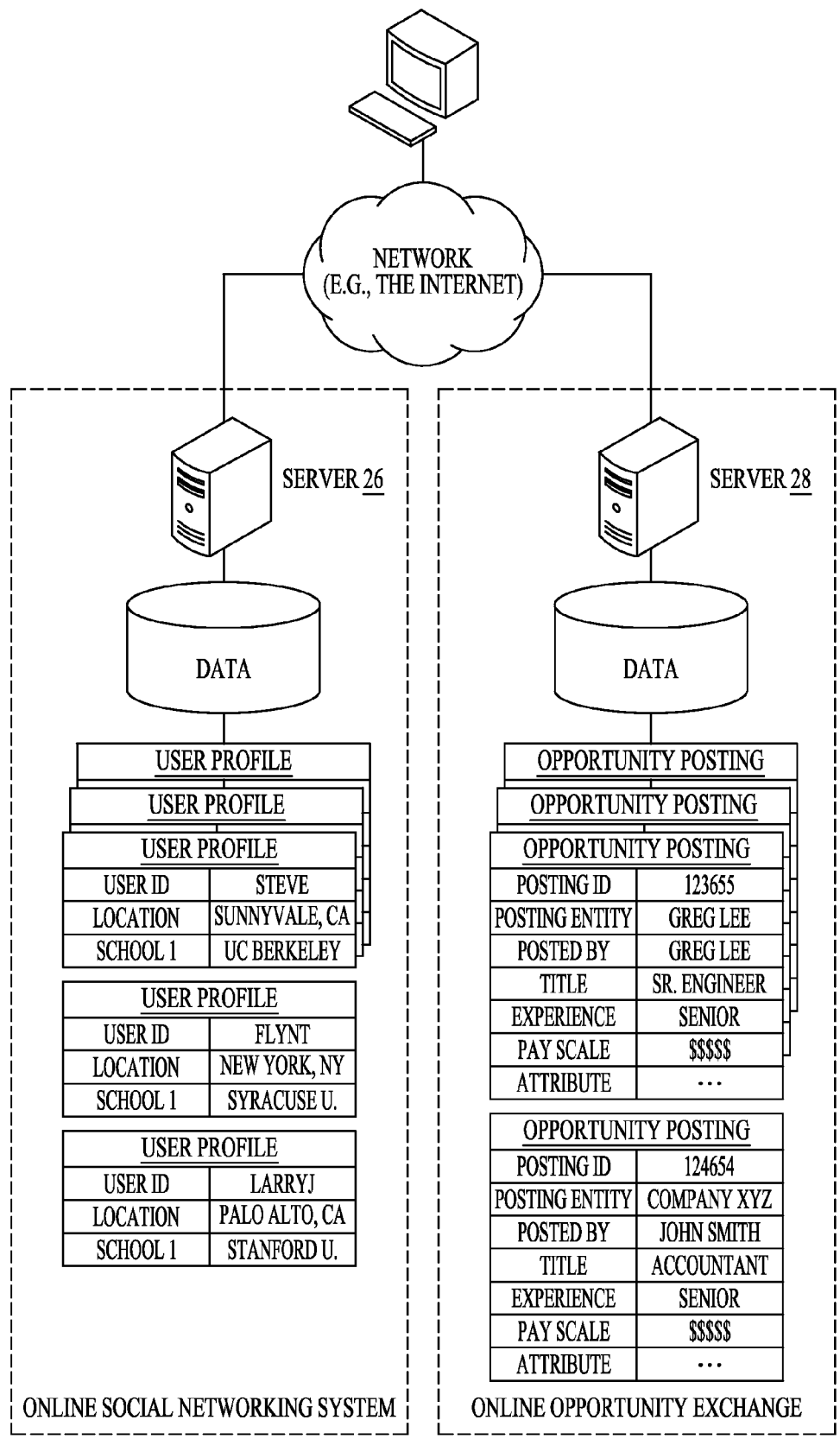
FIG. 17 illustrates an example of a social networking system that is hosted separately from, but integrated with, an online opportunity exchange, according to one embodiment of the invention.
Figure 19:
FIG. 19 illustrates an example of a user interface showing social networking information related to a job search performed at a job search service, consistent with an embodiment of the present invention.

In such an implementation, for example, a single web page may be constructed where one portion of the page interacts directly with the opportunity host and another portion of the page interacts directly with the social network host. Similarly, one or more of the hosting organizations may be hosting a mobile phone or peer-to-peer networking application. This arrangement allows a user of the social networking system to log into the social networking system and then navigate to the special page or interface that interacts also with the opportunity host to carry out a search. The user may then enter an opportunity search query on the search page and then receive from the opportunity host an opportunity posting that lists the name and identity of the organization offering the opportunity. By selecting (e.g., clicking) a special link in that page (as illustrated below in FIG. 17), information is directed to the separate social networking host. For example, the information may include the identity and location of the organization listed as offering the opportunity. Accordingly, the social networking host servers then are able to access the private relationship data of the viewer who initiated the search in order to then display all of the people in the viewer's social network who have or have had a relationship with the opportunity poster or the organization offering the opportunity. For example, FIG. 18 illustrates an example listing of social networking contacts for one job seeker, based on an opportunity query submitted to a host other than the host of the social networking system.

In this way, the viewer's private social network data, and the social network data of other individuals who can connect the viewer to the opportunity poster, is never shared with the opportunity system host nor with the organization offering the opportunity. This method also enables participants in a single social networking system to take advantage of opportunities posted in potentially hundreds of separate opportunities systems through partnerships between the social networking hosts and the opportunities hosts.

Thus, various methods and systems have been provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

The invention claimed is:

1. A method comprising:
    receiving first information, the first information including qualifications of an opportunity seeker, the first information being provided by the opportunity seeker;
    storing the first information in a profile of the opportunity seeker;
    receiving second information, the second information including requirements of an opportunity, the second information being provided by an opportunity creator;
    comparing the qualifications of the opportunity seeker with the requirements of the opportunity;
    based on the comparing, providing the opportunity seeker with an option to be considered by the opportunity creator as a candidate for the opportunity;
    based on an acceptance of the option by the opportunity seeker, automatically submitting, from one or more modules incorporated into a system to configure one or more computer processors of the system, an application for the opportunity on behalf of the opportunity seeker to the opportunity creator, the application including at least some of the first information;

determining a potential reference for the opportunity seeker based on a combination of a seeker closeness score and a creator closeness score, the seeker closeness score measuring a closeness of a relationship between the potential reference and the opportunity seeker within a social network of the opportunity seeker, and the creator closeness score measuring a closeness of a relationship between the potential reference and the opportunity creator within a social network of the opportunity creator; and providing the opportunity seeker with an option to submit a request to the potential reference, the request requesting that the potential reference serve as a reference for the opportunity seeker with respect to the application.

2. The method of claim 1, further comprising:

determining that the profile of the opportunity seeker does not indicate whether the qualifications of the opportunity seeker satisfy at least one of the requirements of the opportunity; and based on the acceptance of the option by the opportunity seeker, prompting the opportunity seeker to provide the indication of whether the qualifications of the opportunity seeker satisfy the at least one of the requirements of the opportunity; and wherein the submitting of the profile of the opportunity seeker to the opportunity creator is further based on the providing of the indication of whether the qualifications of the opportunity seeker satisfy the at least one of the requirements of the opportunity.

3. The method of claim 1, wherein the application further includes a summary of the comparing of the qualifications of the opportunity seeker with the requirements of the opportunity.

4. The method of claim 1, further comprising determining a relevance of the opportunity to the opportunity seeker based on a connection strength between the opportunity seeker and the opportunity creator, the connection strength determined from the social network of the opportunity creator and the social network of the opportunity seeker and wherein the providing of the opportunity seeker with the option to be considered by the opportunity creator as a candidate for the opportunity includes ranking the opportunity among a plurality of opportunities based on the relevance of the opportunity.

5. The method of claim 1, wherein the providing of the opportunity seeker with an option to be considered by the opportunity creator as a candidate for the opportunity is based on a determination that the qualifications of the opportunity seeker satisfy the requirements of the opportunity.

6. The method of claim 1, wherein the application further includes information pertaining to people that the opportunity creator knows who have worked with the opportunity seeker.

7. The method of claim 1, wherein the closeness of the relationship between the potential reference and the opportunity seeker within the social network of the opportunity seeker is based on a number of degrees of separation between the potential reference and the opportunity seeker within the social network of the opportunity seeker.

8. The method of claim 7, wherein the closeness of the relationship between the potential reference and the opportunity seeker within the social network of the opportunity seeker is further based on strengths of connections in a connection chain between the opportunity seeker and the potential reference within the social network of the opportunity seeker.

9. A system comprising:

one more processors of one or more machines configured by one or more modules incorporated into the system to, at least:

receive first information, the first information including qualifications of an opportunity seeker, the first information being provided by the opportunity seeker;

store the first information in a profile of the opportunity seeker;

receive second information, the second information including requirements of an opportunity, the second information being provided by an opportunity creator;

compare the qualifications of the opportunity seeker with the requirements of the opportunity;

based on the comparing, provide the opportunity seeker with an option to be considered by the opportunity creator as a candidate for the opportunity;

based on an acceptance of the option by the opportunity seeker, automatically submit an application for the opportunity on behalf of the opportunity seeker, the application including at least some of the first information;

determining a potential reference for the opportunity seeker based on a combination of a seeker closeness score and a creator closeness score, the seeker closeness score measuring a closeness of a relationship between the potential reference and the opportunity seeker within a social network of the opportunity seeker, and the creator closeness score measuring a closeness of a relationship between the potential reference and the opportunity creator within a social network of the opportunity creator; and providing the opportunity seeker with an option to submit a request to the potential reference, the request requesting that the potential reference serve as a reference for the opportunity seeker with respect to the application.

10. The system of claim 9, the one or more processors further configured to:

determine that the profile of the opportunity seeker does not indicate whether the qualifications of the opportunity seeker satisfy at least one of the requirements of the opportunity; and based on the acceptance of the option by the opportunity seeker, prompt the opportunity seeker to provide the indication of whether the qualifications of the opportunity seeker satisfy the at least one of the requirements of the opportunity; and wherein the submitting of the profile of the opportunity seeker to the opportunity creator is further based on the providing of the indication of whether the qualifications of the opportunity seeker satisfy the at least one of the requirements of the opportunity.

11. The system of claim 9, wherein the application further includes a summary of the comparing of the qualifications of the opportunity seeker with the requirements of the opportunity.

12. The system of claim 9, the one or more processors further configured to determine a relevance of the opportunity to the opportunity seeker based on a connection strength between the opportunity seeker and the opportunity creator, the connection strength determined from the social network of the opportunity creator and the social network of the opportunity seeker and wherein the providing of the opportunity seeker with the option to be considered by the opportunity creator as a candidate for the opportunity includes ranking the opportunity among a plurality of opportunities based on the relevance of the opportunity.

13. The system of claim 9, wherein the providing of the opportunity seeker with an option to be considered by the opportunity creator as a candidate for the opportunity is based on a determination that the qualifications of the opportunity seeker satisfy the requirements of the opportunity.

14. The system of claim 9, wherein the application further includes information pertaining to people that the opportunity creator knows who have worked with the opportunity seeker.

15. A non-transitory computer readable storage medium embodying a set of instructions that, when executed by one or more processors, cause the one or more processors to perform operations, the operations comprising:
receiving first information, the first information including qualifications of an opportunity seeker, the first information being provided by the opportunity seeker;
storing the first information in a profile of the opportunity seeker;
receiving second information, the second information including requirements of an opportunity, the second information being provided by an opportunity creator;
comparing the qualifications of the opportunity seeker with the requirements of the opportunity;
based on the comparing, providing the opportunity seeker with an option to be considered by the opportunity creator as a candidate for the opportunity;
based on an acceptance of the option by the opportunity seeker, submitting an application for the opportunity on behalf of the opportunity seeker, the application including at least some of the first information;
determining a potential reference for the opportunity seeker based on a combination of a seeker closeness score and a creator closeness score, the seeker closeness score measuring a closeness of a relationship between the potential reference and the opportunity seeker within a social network of the opportunity seeker, and the creator closeness score measuring a closeness of a relationship between the potential reference and the opportunity creator within a social network of the opportunity creator; and
providing the opportunity seeker with an option to submit a request to the potential reference, the request requesting that the potential reference serve as a reference for the opportunity seeker with respect to the application.

16. The non-transitory computer readable storage medium of claim 15, the operations further comprising:
determining that the profile of the opportunity seeker does not indicate whether the qualifications of the opportunity seeker satisfy at least one of the requirements of the opportunity; and
based on the acceptance of the option by the opportunity seeker, prompting the opportunity seeker to provide the indication of whether the qualifications of the opportunity seeker satisfy the at least one of the requirements of the opportunity; and
wherein the submitting of the profile of the opportunity seeker to the opportunity creator is further based on the providing of the indication of whether the qualifications of the opportunity seeker satisfy the at least one of the requirements of the opportunity.

17. The non-transitory computer readable storage medium of claim 15, wherein the application further includes a summary of the comparing of the qualifications of the opportunity seeker with the requirements of the opportunity.

18. The non-transitory computer readable storage medium of claim 15, the operations further comprising determining a relevance of the opportunity to the opportunity seeker based on a connection strength between the opportunity seeker and the opportunity creator, the connection strength determined from the social network of the opportunity creator and the social network of the opportunity seeker and wherein the providing of the opportunity seeker with the option to be considered by the opportunity creator as a candidate for the opportunity includes ranking the opportunity among a plurality of opportunities based on the relevance of the opportunity.

19. The non-transitory computer readable storage medium of claim 15, wherein the providing of the opportunity seeker with an option to be considered by the opportunity creator as a candidate for the opportunity is based on a determination that the qualifications of the opportunity seeker satisfy the requirements of the opportunity.

* * * * *

UNITED STATES PATENT AND TRADEMARK OFFICE
CERTIFICATE OF CORRECTION

PATENT NO. : 9,536,226 B2
APPLICATION NO. : 14/262198
DATED : January 3, 2017
INVENTOR(S) : Elman et al.

It is certified that error appears in the above-identified patent and that said Letters Patent is hereby corrected as shown below:

On page 2, in Column 2, under "Other Publications", Line 9, delete "Apr. 29, 2008" and insert --Apr. 29, 2013--, therefor On page 2, in Column 2, under "Other Publications", Line 46, delete "Oct. 28, 2007"," and insert --Oct. 29, 2007",--, therefor Signed and Sealed this
Third Day of April, 2018

Andrei Iancu
*Director of the United States Patent and Trademark Office*